US012106715B2

(12) United States Patent
Chung

(10) Patent No.: US 12,106,715 B2
(45) Date of Patent: Oct. 1, 2024

(54) LIGHT EMITTING DISPLAY DEVICE

(71) Applicant: Samsung Display Co., LTD., Yongin-si (KR)

(72) Inventor: Kyung Hoon Chung, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/227,032

(22) Filed: Jul. 27, 2023

(65) Prior Publication Data

US 2024/0046871 A1 Feb. 8, 2024

(30) Foreign Application Priority Data

Aug. 3, 2022 (KR) ........................ 10-2022-0096797

(51) Int. Cl.

*G09G 3/3233* (2016.01)
*G09G 3/3258* (2016.01)
*G09G 3/3266* (2016.01)
*G09G 3/3275* (2016.01)

(52) U.S. Cl.

CPC ......... *G09G 3/3233* (2013.01); *G09G 3/3258* (2013.01); *G09G 3/3266* (2013.01); *G09G 3/3275* (2013.01); *G09G 2300/0842* (2013.01)

(58) Field of Classification Search

CPC ............... G09G 3/3233; G09G 3/3258; G09G 3/3266; G09G 3/3275; G09G 2300/0842

See application file for complete search history.

(56) References Cited

U.S. PATENT DOCUMENTS

2014/0176525 A1* 6/2014 Woo ..................... G09G 3/3233 345/212

FOREIGN PATENT DOCUMENTS

| | | | | |
|---|---|---|---|---|
| CN | 107908310 A * | 4/2018 | ........... | G06F 3/0412 |
| CN | 109584788 A | 4/2019 | | |
| CN | 110060630 A | 7/2019 | | |
| KR | 101202039 B1 | 11/2012 | | |
| KR | 101549252 B1 | 9/2015 | | |
| KR | 102016391 B1 | 8/2019 | | |

* cited by examiner

*Primary Examiner* — Stephen G Sherman
(74) *Attorney, Agent, or Firm* — KILE PARK REED & HOUTTEMAN PLLC

(57) ABSTRACT

A light-emitting display device includes a light-emitting element including an anode connected to a first driving voltage line, a first transistor including a gate electrode, a first electrode, and a second electrode, a second transistor including first and second electrodes respectively connected to a data line and the gate electrode, a third transistor including first and second electrodes respectively connected to the first driving voltage line and the first electrode of the first transistor, a fourth transistor including first and second electrodes respectively connected to a sensing line and the second electrode of the first transistor, a fifth transistor including first and second electrodes respectively connected to the second electrode of the first transistor, and a second driving voltage line, and a capacitor including first and second electrodes respectively connected to the gate electrode and the second electrode of the first transistor.

22 Claims, 24 Drawing Sheets

LIGHT EMITTING DISPLAY DEVICE

This application claims priority to Korean Patent Application No. 10-2022-0096797, filed on Aug. 3, 2022, and all the benefits accruing therefrom under 35 U.S.C. § 119, the content of which in its entirety is herein incorporated by reference.

BACKGROUND

1. Field

The disclosure relates to a light-emitting display device, and more specifically, to a light-emitting display device having a pixel to which a pixel driving circuit for driving a light-emitting element and a cathode of the light-emitting element are connected.

2. Description of the Related Art

A display device displays an image, and includes a liquid crystal display ("LCD"), an organic light-emitting diode ("OLED") display, and the like. The display device is used in various electronic devices such as a mobile phone, a navigation device, a digital camera, an electronic book, a portable game machine, and various terminals.

A display device such as an organic light-emitting display device may have a structure that may be bent or folded by a flexible substrate.

A structure of a pixel used in the organic light-emitting device is being variously developed.

SUMMARY

Embodiments are to provide an inverted pixel having a novel structure, that is, a pixel to which a pixel driving circuit for driving a light-emitting element and a cathode of the light-emitting element are connected.

An embodiment provides a light-emitting display device including a light-emitting element including a cathode, and an anode connected to a first driving voltage line, a first transistor including a gate electrode, a first electrode, and a second electrode, a second transistor including a gate electrode, a first electrode connected to a data line, and a second electrode connected to the gate electrode of the first transistor, a third transistor including a gate electrode, a first electrode connected to the first driving voltage line, and a second electrode connected to the first electrode of the first transistor, a fourth transistor including a gate electrode, a first electrode connected to a sensing line, and a second electrode connected to the second electrode of the first transistor, a fifth transistor including a gate electrode, a first electrode connected to the second electrode of the first transistor, and a second electrode connected to a second driving voltage line, and a capacitor including a first electrode connected to the gate electrode of the first transistor and a second electrode connected to the second electrode of the first transistor, wherein the first electrode of the first transistor is connected to the cathode of the light-emitting element, and the sensing line is divided into a section in which an initialization voltage is transmitted and a section in which a voltage or current of the second electrode of the first transistor is sensed.

In an embodiment, the sensing line may be electrically connected to an initialization and sensing operation part disposed in a non-display area.

In an embodiment, the initialization and sensing operation part may include an initialization part that transmits the initialization voltage to the sensing line, and a sensing operation part which senses a voltage or current of the second electrode of the capacitor through the sensing line.

In an embodiment, the initialization part may include a first switch part that includes a first end to which the initialization voltage is applied and a second end connected to the sensing line.

In an embodiment, the sensing operation part may previously supply a pre-charge voltage to the sensing line to pre-charge a voltage level of the sensing line to a predetermined voltage level, separate the sensing line and the sensing operation part from each other to float the sensing line, and then connect the sensing line and the sensing operation part again to measure a voltage or current through the sensing line.

In an embodiment, the gate electrode of the second transistor may be connected to a first scan line, the gate electrode of the third transistor and the gate electrode of the fourth transistor may be connected to a second scan line, and the gate electrode of the fifth transistor may be connected to a light-emitting signal line.

In an embodiment, in an operation of sensing a threshold voltage of the first transistor, a gate-on voltage may be applied to the first scan line and the second scan line, and a gate-off voltage may be applied to the light-emitting signal line.

In an embodiment, the operation of sensing the threshold voltage of the first transistor may be divided into an initialization period and a threshold voltage sensing period, during the initialization period and the threshold voltage sensing period, a reference voltage may be applied to the data line, in the initialization period, the sensing line may transmit the initialization voltage, and in the threshold voltage sensing period, the initialization voltage may not be transmitted to the sensing line, and the sensing line may transmit a voltage or current of the second electrode of the first transistor.

In an embodiment, an operation of sensing charge mobility of the first transistor may be divided into an initialization period in which a gate-on voltage is applied to the first scan line and the second scan line and a gate-off voltage is applied to the light-emitting signal line, and a mobility sensing period in which a gate-on voltage is applied to the second scan line and a gate-off voltage is applied to the first scan line and the light-emitting signal line.

In an embodiment, during the initialization period, a reference voltage may be applied to the data line, in the initialization period, the sensing line may transmit the initialization voltage, and in the mobility sensing period, the initialization voltage may not be transmitted to the sensing line, and the sensing line may transmit a voltage or current of the second electrode of the first transistor.

In an embodiment, an operation of emitting light from the light-emitting element may include a writing period and a light-emitting period, a gate-on voltage may be applied to the first scan line only in the writing period, and a gate-on voltage may be applied to the light-emitting signal line and a gate-off voltage may be applied to the second scan line, in the writing period and the light-emitting period.

In an embodiment, an operation of emitting light from the light-emitting element may include a writing period and a light-emitting period, in the writing period, a gate-on voltage may be applied to the first scan line and the second scan line, and a gate-off voltage may be applied to the light-emitting signal line, and in the light-emitting period, a gate-off voltage may be applied to the first scan line and the second scan line, and a gate-on voltage may be applied to the light-emitting signal line.

In an embodiment, the light-emitting display device may further include a sixth transistor disposed between the light-emitting element and the first transistor, wherein a gate electrode of the sixth transistor may be connected to the light-emitting signal line, a first electrode of the sixth transistor may be directly connected to the cathode of the light-emitting element, and a second electrode of the sixth transistor may be directly connected to the first electrode of the first transistor.

In an embodiment, another embodiment provides a light-emitting display device including a light-emitting element including a cathode, and an anode connected to a first driving voltage line, a first transistor including a gate electrode, a first electrode, and a second electrode, a second transistor including a gate electrode, a first electrode connected to a data line, and a second electrode connected to the gate electrode of the first transistor, a third transistor including a gate electrode, a first electrode connected to the first driving voltage line, and a second electrode connected to the first electrode of the first transistor, a fourth transistor including a gate electrode, a first electrode connected to a sensing line, and a second electrode connected to the second electrode of the first transistor, a fifth transistor including a gate electrode, a first electrode connected to the second electrode of the first transistor, and a second electrode connected to a second driving voltage line, a sixth transistor including a gate electrode, a first electrode connected to the cathode of the light-emitting element, and a second electrode connected to the first electrode of the first transistor, and a capacitor including a first electrode connected to the gate electrode of the first transistor and a second electrode connected to the second electrode of the first transistor.

In an embodiment, the gate electrode of the second transistor may be connected to a first scan line, the gate electrode of the fourth transistor may be connected to a second scan line, the gate electrode of the third transistor may be connected to a third scan line, and the gate electrode of the fifth transistor and the gate electrode of the sixth transistor may be connected to a light-emitting signal line.

In an embodiment, the operation of sensing the threshold voltage of the first transistor may be divided into an initialization period and a threshold voltage sensing period, in the initialization period, a gate-on voltage may be applied to the first scan line and the second scan line, and a gate-off voltage may be applied to the third scan line and the light-emitting signal line, in the threshold voltage sensing period, a gate-on voltage may be applied to the first scan line, the second scan line, and the third scan line, and a gate-off voltage may be applied to the light-emitting signal line, during the initialization period and the threshold voltage sensing period, a reference voltage may be applied to the data line, in the initialization period, the sensing line may transmit an initialization voltage, and in the threshold voltage sensing period, the initialization voltage may not be transmitted to the sensing line, and the sensing line may transmit a voltage or current of the second electrode of the first transistor.

In an embodiment, an operation of sensing charge mobility of the first transistor may be divided into an initialization period in which a gate-on voltage is applied to the first scan line and the second scan line and a gate-off voltage is applied to the third scan line and the light-emitting signal line, and a mobility sensing period in which a gate-on voltage is applied to the second scan line and the third scan line and a gate-off voltage is applied to the first scan line and the light-emitting signal line, during the initialization period, a reference voltage may be applied to the data line, in the initialization period, the sensing line may transmit an initialization voltage, and in the mobility sensing period, the initialization voltage may not be transmitted to the sensing line, and the sensing line may transmit a voltage or current of the second electrode of the first transistor.

In an embodiment, an operation of emitting light from the light-emitting element may include a writing period and a light-emitting period, a gate-on voltage may be applied to the first scan line only in the writing period, and a gate-on voltage may be applied to the light-emitting signal line and a gate-off voltage may be applied to the second scan line and the third scan line, in the writing period and the light-emitting period.

In an embodiment, an operation of emitting light from the light-emitting element may include a writing period and a light-emitting period, in the writing period, a gate-on voltage may be applied to the first scan line and the second scan line, and a gate-off voltage may be applied to the third scan line and the light-emitting signal line, and in the light-emitting period, a gate-off voltage may be applied to the first scan line, the second scan line, and the third scan line, and a gate-on voltage may be applied to the light-emitting signal line.

In an embodiment, the sensing line may be electrically connected to an initialization and sensing operation part disposed in a non-display area, and the initialization and sensing operation part may include an initialization part transmitting an initialization voltage to the sensing line, and a sensing operation part sensing a voltage or current of the second electrode of the capacitor through the sensing line.

By the embodiments, it is possible to provide a display device including a pixel (an inverted pixel) that has a novel structure and in which a light-emitting element is disposed at a first driving voltage side based on a first transistor.

It is possible to sense a threshold voltage and/or charge mobility of a first transistor, so that characteristics of the first transistor may be confirmed in more detail.

In addition, it is possible to reduce an area of a pixel, by forming a sensing operation part sensing a threshold voltage and/or charge mobility of a first transistor outside the pixel and by applying an initialization voltage or performing a sensing operation through one sensing line, thereby providing a display device having higher resolution.

In addition, since a pixel has an inverted pixel structure, a light-emitting element is separated from a source electrode of a first transistor, so that when a voltage of each portion of a pixel driving circuit is changed, a voltage fluctuation of the source electrode of the first transistor may be small.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
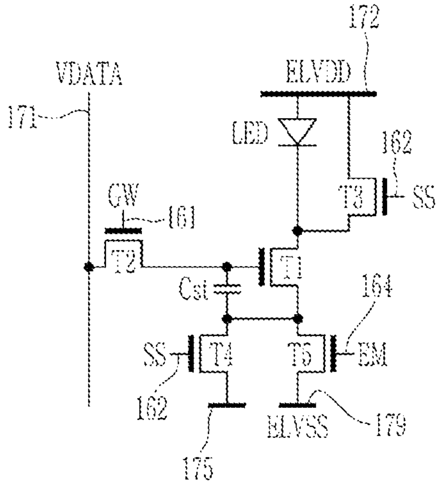
FIG. 1 illustrates an equivalent circuit diagram of an embodiment of one pixel included in a light-emitting display device.

Embodiments of the disclosure will be described more fully hereinafter with reference to the accompanying drawings, in which embodiments of the invention are shown. As those skilled in the art would realize, the described embodiments may be modified in various different ways, all without departing from the spirit or scope of the invention.

In order to clearly describe the invention, parts or portions that are irrelevant to the description are omitted, and identical or similar constituent elements throughout the specification are denoted by the same reference numerals.

Further, in the drawings, the size and thickness of each element are arbitrarily illustrated for ease of description, and the disclosure is not necessarily limited to those illustrated in the drawings. In the drawings, the thicknesses of layers, films, panels, regions, areas, etc., are exaggerated for clarity. In the drawings, for ease of description, the thicknesses of some layers and areas are exaggerated.

It will be understood that when an element such as a layer, film, region, area, substrate, plate, or constituent element is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, throughout the specification, the phrase "in a plan view" means viewing a target portion from the top, and the phrase "in a cross-sectional view" means viewing a cross-section formed by vertically cutting a target portion from the side.

In addition, throughout the specification, "connected" does not only mean when two or more elements are directly connected, but when two or more elements are indirectly connected through other elements, and when they are physically connected or electrically connected, and further, it may be referred to by different names depending on a position or function, and may also be referred to as a case in which respective parts that are substantially integrated are linked to each other.

In addition, throughout the specification, when it is said that an element such as a wire, layer, film, region, area, substrate, plate, or constituent element "is extended (or extends) in a first direction or second direction", this does not mean only a straight shape extending straight in the corresponding direction, but may mean a structure that substantially extends in the first direction or the second direction, is partially bent, has a zigzag structure, or extends while having a curved structure.

In addition, both an electronic device (e.g., a mobile phone, a television ("TV"), a monitor, a laptop computer, etc.) including a display device, or a display panel described in the specification, and an electronic device including a display device and a display panel manufactured by a manufacturing method described in the specification are not excluded from the scope of the specification.

The term "part" as used herein is intended to mean a software component or a hardware component that performs a predetermined function. The hardware component may include a field-programmable gate array ("FPGA") or an application-specific integrated circuit ("ASIC"), for example. The software component may refer to an executable code and/or data used by the executable code in an addressable storage medium. Thus, the software components may be object-oriented software components, class components, and task components, and may include processes, functions, attributes, procedures, subroutines, segments of program code, drivers, firmware, micro codes, circuits, data, a database, data structures, tables, arrays, or variables, for example.

Hereinafter, a circuit structure of one pixel of a light-emitting display device in an embodiment will be described with reference to FIG. 1.

FIG. 1 illustrates an equivalent circuit diagram of an embodiment of one pixel included in a light-emitting display device.

Referring to FIG. 1, one pixel includes a light-emitting element LED and a pixel driving circuit for driving the same, and the pixel driving circuit is arranged in a matrix form. The pixel driving circuit includes all elements except for the light-emitting element LED in FIG. 1, and the pixel driving circuit of the pixel in the embodiment of FIG. 1 includes a first transistor T1, a second transistor T2, a third transistor T3, a fourth transistor T4, a fifth transistor T5, and a capacitor Cst (hereinafter referred to as a storage capacitor).

In addition, the pixel driving circuit may be connected to a first scan line 161 to which a first scan signal GW is applied, a second scan line 162 to which a second scan signal SS is applied, a light-emitting signal line 164 to which a light-emitting signal EM is applied, and a data line 171 to which a data voltage VDATA or a reference voltage Vref is applied. In addition, the pixel may be connected to a first driving voltage line 172 to which a driving voltage ELVDD (hereinafter also referred to as a first driving voltage) is applied, a second driving voltage line 179 to which a driving low voltage ELVSS (hereinafter also referred to as a second driving voltage) is applied, and a sensing line 175 connected to an initialization and sensing operation part (refer to FIG. 22) for performing initialization and sensing operations.

A structure of the pixel will now be described focusing on respective elements (the transistors, the capacitor, and the light-emitting element) included in the pixel as follows.

The first transistor T1 (hereinafter also referred to as a driving transistor) includes a gate electrode connected to a first electrode of the storage capacitor Cst, a first electrode (an input-side electrode) connected to a cathode of the light-emitting element LED and a second electrode of the third transistor T3, and a second electrode (an output-side electrode) connected to a second electrode of the fourth transistor T4, a second electrode of the storage capacitor Cst, and a first electrode of the fifth transistor T5.

In the first transistor T1, a degree to which the first transistor T1 is turned on is determined according to a voltage of the gate electrode thereof, and an amount of a current flowing from the first electrode to the second electrode of the first transistor T1 according to the turned on degree is determined. The current flowing from the first electrode to the second electrode of the first transistor T1 is the same as a current flowing through the light-emitting element LED, so it may be also referred to as a light-emitting current. Here, the first transistor T1 is formed as an n-type transistor, and as a voltage of the gate electrode thereof increases, a substantially large light-emitting current may flow. When the light-emitting current is substantially large, the light-emitting element LED may display substantially high luminance.

The second transistor T2 (hereinafter also referred to as a data input transistor) includes a gate electrode connected to the first scan line 161 to which the first scan signal GW is applied, a first electrode (an input-side electrode) connected to the data line 171 to which the data voltage VDATA and the reference voltage Vref are applied, and a second electrode (an output-side electrode) connected to the first electrode of the storage capacitor Cst and the gate electrode of the first transistor T1. The second transistor T2 inputs the data voltage VDATA and the reference voltage Vref into the pixel according to the first scan signal GW to transmit them to the gate electrode of the first transistor T1 and to store them in the first electrode of the storage capacitor Cst.

The third transistor T3 (hereinafter also referred to as a voltage transmitting transistor) includes a gate electrode connected to the second scan line 162 to which the second scan signal SS is applied, a first electrode (an input-side electrode) connected to the first driving voltage line 172, and a second electrode (an output-side electrode) connected to the first electrode of the first transistor T1 and the cathode of the light-emitting element LED. The third transistor T3 allows the first driving voltage ELVDD to be transmitted to the first transistor T1 without passing through the light-emitting element LED. This is to transmit the first driving voltage ELVDD to the first transistor T1 through a separate path since a problem that the light-emitting element LED unnecessarily emits light when a current flows through the light-emitting element LED may occur. Therefore, the third transistor T3 may not be turned on during a light-emitting period, and may be turned on during other periods.

The fourth transistor T4 (hereinafter also referred to as a sensing transistor) includes a gate electrode connected to the second scan line 162 to which the second scan signal SS is applied, a first electrode connected to the sensing line 175, and a second electrode connected to the second electrode of the first transistor T1, the first electrode of the fifth transistor T5, and the second electrode of the storage capacitor Cst. The fourth transistor T4 is a transistor configuring a path for sensing the threshold voltage and/or charge mobility of the first transistor T1, and may additionally initialize the second electrode of the storage capacitor Cst. As a result, the fourth transistor T4 may be also referred to as an initialization transistor in addition to the sensing transistor. Therefore, the sensing line 175 may be divided into a section for transmitting the initialization voltage Vint and a section for sensing the voltage or current of the second electrode of the first transistor T1 or the second electrode of the storage capacitor Cst. Like the third transistor T3, the fourth transistor T4 may not be turned on during the light-emitting period, and may be turned on during other periods.

The fifth transistor T5 (hereinafter also referred to as a driving low voltage-applying transistor) includes a gate electrode connected to the light-emitting signal line 164 to which the light-emitting signal EM is applied, a first electrode connected to the second electrode of the first transistor T1, the second electrode of the fourth transistor T4, and the second electrode of the storage capacitor Cst, and a second electrode receiving the second driving voltage ELVSS. The fifth transistor T5 serves to transmit or block the second driving voltage ELVSS to the second electrode of the first transistor T1 based on the light-emitting signal EM.

In the embodiment of FIG. 1, all the transistors are formed as n-type transistors, and each transistor may be turned on when the voltage of the gate electrode is a high level voltage, and may be turned off when the voltage of the gate electrode is a low level voltage. In addition, a semiconductor layer included in each transistor may use a polycrystalline silicon semiconductor or an oxide semiconductor, and may additionally use an amorphous semiconductor or a single crystal semiconductor.

In some embodiments, the semiconductor layer included in each transistor may further include an overlapping layer (or an additional gate electrode) overlapping it, and by applying a voltage to the overlapping layer (the additional gate electrode) to change characteristics of the transistor, it is possible to further improve the display quality of the pixel.

The storage capacitor Cst includes a first electrode connected to the gate electrode of the first transistor T1 and the second electrode of the second transistor T2, and a second electrode connected to the second electrode of the fourth transistor T4 and the first electrode of the fifth transistor T5. The first electrode of the storage capacitor Cst receives the data voltage VDATA or reference voltage Vref from the second transistor T2 to store it. The second electrode of the storage capacitor Cst may be initialized by a voltage (the initialization voltage Vint) transmitted from the sensing line 175 through the fourth transistor T4, and may store a voltage to sense a threshold voltage or configure a path through which a current passes to sense mobility.

The light-emitting element LED includes an anode connected to the first driving voltage line 172 to receive the first driving voltage ELVDD, and a cathode connected to the first electrode of the first transistor T1. The light-emitting element LED is disposed between the pixel driving circuit and the first driving voltage ELVDD, the same current as the current flowing through the first transistor T1 of the pixel driving circuit flows in it, and luminance at which it emits light may also be determined according to an amount of a corresponding current. The light-emitting element LED may include a light-emitting layer including at least one of an organic light-emitting material and an inorganic light-emitting material between the anode and the cathode. A detailed stacked structure of the light-emitting element LED in the embodiment will be described with reference to FIG. 23 and FIG. 24.

The pixel in the embodiment of FIG. 1 senses a change in the characteristic (threshold voltage and/or charge mobility) of the first transistor T1 in a separate configuration (e.g., a sensing operation part of FIG. 22) disposed outside the pixel, and then may change the data voltage VDATA according to the sensed result to apply it to the pixel. That is, the pixel in the illustrated embodiment does not include a structure for compensating the threshold voltage of the first transistor T1. In the illustrated embodiment, since characteristics of the first transistor T1 such as the charge mobility may be considered in addition to the change in the threshold voltage, the change in the characteristics of the first transistor T1 may be sensed in more detail, and accordingly, the first transistor T1 may be operated. As a result, the first transistor T1 may more precisely and accurately generate an output current, and display quality may be improved.

In addition, since each pixel does not include a structure for compensating for the threshold voltage of the first transistor T1, an area occupied by the pixel driving circuit may be small, and even when an area of the light-emitting display device is the same, more pixels may be formed, and the display screen may also have a higher resolution.

In addition, in FIG. 1, the light-emitting element LED is disposed between the first electrode of the first transistor T1 and the first driving voltage line 172. The pixel in the illustrated embodiment is also referred to as an inverted pixel because the pixel driving circuit for driving the light-emitting element and the cathode of the light-emitting element are connected. The light-emitting element displays luminance according to an amount of a current flowing in a current path connected from the first driving voltage ELVDD to the second driving voltage ELVSS through the first transistor T1, and as the amount of the current increases, the displayed luminance may increase. In the inverted pixel structure of FIG. 1, since the first electrode of the first transistor T1 is connected to the light-emitting element LED, and is separated from the second electrode (source electrode) of the first transistor T1, when a voltage of each part of the pixel driving circuit is changed, a voltage of the second electrode (source electrode) of the first transistor T1 may not be changed.

In the embodiment of FIG. 1, it has been described that one pixel PX includes five transistors T1 to T5 and one capacitor (the storage capacitor Cst), but the invention is not limited thereto, and in some embodiments, an additional capacitor or transistor may be further included, and some capacitors or transistors may be omitted.

In the above, the circuit structure of the pixel in the embodiment has been described with reference to FIG. 1.

Hereinafter, a waveform of a signal applied to the pixel of FIG. 1 and an operation of the pixel according to the waveform will be described with reference to FIG. 2 to FIG. 12.

The pixel of FIG. 1 may be operated by applying signals of different waveforms for various purposes, and hereinafter, an operation of sensing a threshold voltage in an embodiment will be described with reference to FIG. 2 to FIG. 4, an operation of sensing mobility in an embodiment will be described with reference to FIG. 5 to FIG. 7, an operation of writing and emitting light in an embodiment will be described with reference to FIG. 8 and FIG. 10, and an operation of writing and emitting light in another embodiment will be described with reference to FIG. 10 to FIG. 12.

First, an operation of sensing a threshold voltage in an embodiment will be described with reference to FIG. 2 to FIG. 4.

Figure 2:
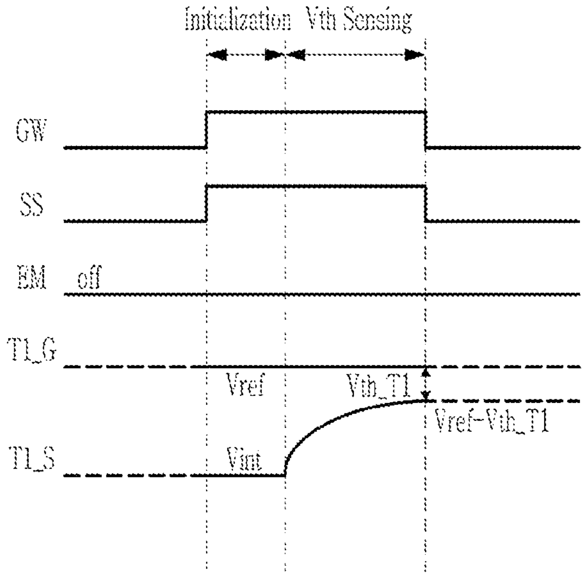
FIG. 2 illustrates a waveform diagram of an embodiment of a signal applied to the pixel of FIG. 1 for sensing a threshold voltage.
Figure 3:
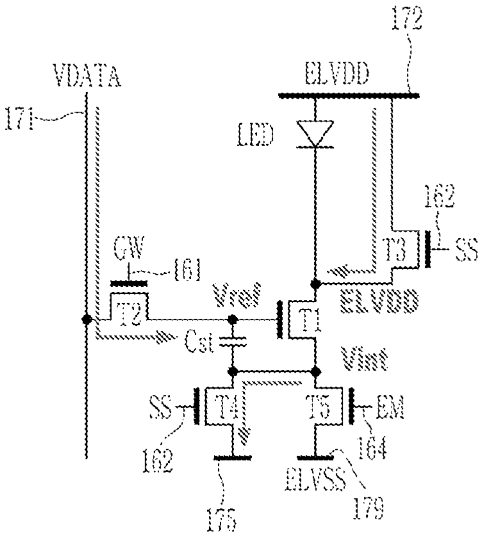
FIG. 3 and FIG. 4 illustrate drawings for explaining an operation of the pixel of FIG. 1 for each period based on the signal of FIG. 2.
Figure 4:
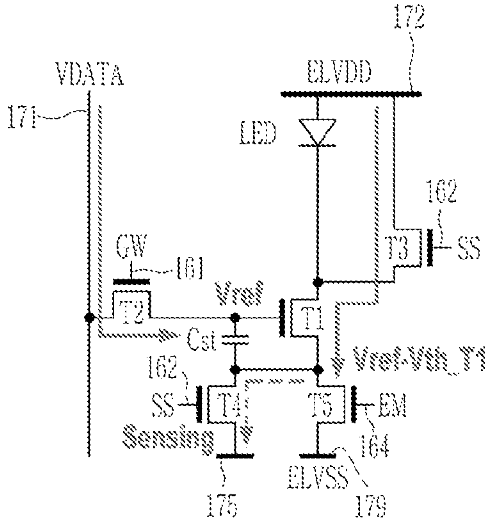

FIG. 2 illustrates a waveform diagram of an embodiment of a signal applied to the pixel of FIG. 1 for sensing a threshold voltage, and FIG. 3 and FIG. 4 illustrate drawings for explaining an operation of the pixel of FIG. 1 for each period based on the signal of FIG. 2.

In FIG. 2, in addition to the waveform diagrams of the first scan signal GW, the second scan signal SS, and the light-emitting signal EM, according to these signals, voltage changes of the gate electrode and the second electrode of the first transistor T1 are shown as T1_G and T1_S.

The operation of sensing the threshold voltage in the embodiment may include an initialization period and a threshold voltage sensing period for sensing the threshold voltage Vth as shown in FIG. 2.

First, the initialization period is a period in which an initialization voltage Vint initializes the second electrode of the storage capacitor Cst, the second electrode of the first transistor T1, and the first electrode of the fifth transistor T5 through the sensing line 175 and the fourth transistor T4, and in which the reference voltage Vref is applied to the gate electrode of the first transistor T1 and the first electrode of the storage capacitor Cst. The initialization period is a period in which the threshold voltage is set to a voltage value desired for a threshold voltage sensing operation before the threshold voltage is sensed.

Referring to FIG. 2, in the initialization period, the first scan signal GW and the second scan signal SS are applied as a gate-on voltage (a high level voltage), and the light-emitting signal EM is applied as a gate-off voltage (a low level voltage).

As a result, as shown in FIG. 3, the second transistor T2, the third transistor T3, and the fourth transistor T4 are in a turn on state, and the fifth transistor T5 is in a turn off state.

The reference voltage Vref applied to the data line 171 through the turned-on second transistor T2 is applied to the gate electrode of the first transistor T1 and the first electrode of the storage capacitor Cst, and the first driving voltage ELVDD is transmitted to the first electrode of the first transistor T1 through the turned-on third transistor T3. In addition, the initialization voltage Vint is applied from the sensing line 175 through the turned-on fourth transistor T4, so that the second electrode of the storage capacitor Cst, the second electrode of the first transistor T1, and the first electrode of the fifth transistor T5 are initialized to the initialization voltage Vint.

As a result, in the initialization period, as shown in T1_G of FIG. 2, the voltage of the gate electrode of the first transistor T1 has the same voltage value as the reference voltage Vref applied to data line 171, and as shown in T1_S of FIG. 2, the voltage of the second electrode of the first transistor T1 has the same voltage as the initialization voltage Vint applied to the sensing line 175.

Here, the initialization voltage Vint may have a relatively low level voltage value compared to the reference voltage Vref, and the reference voltage Vref may have a voltage value capable of turning on the first transistor T1. Since the reference voltage Vref is applied to the gate electrode in the initialization period, the first transistor T1 is in a turn on state, but since the initialization voltage Vint is applied to the second electrode of the first transistor T1, the voltage of the second electrode of the first transistor T1 is maintained at the initialization voltage Vint.

After that, the threshold voltage sensing period for sensing the threshold voltage Vth is entered.

Referring to FIG. 2 and FIG. 4, in the threshold voltage (Vth) sensing period, like the initialization period, the first scan signal GW and the second scan signal SS are applied as a gate-on voltage (a high level voltage), and the emitting signal EM is applied as a gate-off voltage (a low level voltage), while as the sensing line 175 no longer transmits the initialization voltage Vint, the initialization period is changed to the threshold voltage sensing period for sensing the threshold voltage Vth.

As a result, as shown in T1_S of FIG. 2, in the threshold voltage sensing period for sensing the threshold voltage Vth, when the voltage value of the second electrode of the first transistor T1 gradually increases until it reaches a voltage obtained by subtracting a threshold voltage value Vth_T1 of the first transistor from the reference voltage Vref, the voltage no longer increases.

The voltage change of the second electrode of the first transistor T1 will be described in detail with reference to FIG. 2 and FIG. 3 as follows.

As the second electrode of the first transistor T1, which is turned on with the reference voltage Vref applied to the gate electrode in the initialization period, enters the threshold voltage sensing period for sensing the threshold voltage Vth, the sensing line 175 no longer transmits the initialization voltage Vint, so that the output current of the first transistor T1 starts to be outputted to the second electrode of the first transistor T1. As a result, the voltage of the second electrode of the first transistor T1 gradually increases.

The first transistor T1 is maintained in the turned-on state when the voltage of the gate electrode is higher than the voltage of the second electrode of the first transistor T1 by at least a threshold voltage. Then, as the voltage of the second electrode of the first transistor T1 gradually increases, when a value obtained by subtracting the second electrode of the first transistor T1 from the voltage of the gate electrode is the threshold voltage value Vth_T1 of the first transistor T1, the first transistor T1 is turned off. Accordingly, the voltage (Vref-Vth_T1) when the first transistor T1 is turned off is stored in the second electrode of the storage capacitor Cst. In this case, the sensing line 175 does not transmit the initialization voltage Vint, but it serves to transmit the voltages or currents of the second electrode of the first transistor T1 and the second electrode of the storage capacitor Cst. A sensing operation part (refer to FIG. 22) connected to the sensing line 175 checks the voltage value of the second electrode of the storage capacitor Cst, and then by removing the known reference voltage Vref, it may check the threshold voltage value Vth_T1 of the first transistor T1.

In the above, the operation of sensing the threshold voltage in the embodiment by the pixel of FIG. 1 has been described.

Hereinafter, an operation of sensing mobility in an embodiment will be described with reference to FIG. 5 and FIG. 7.

Figure 5:
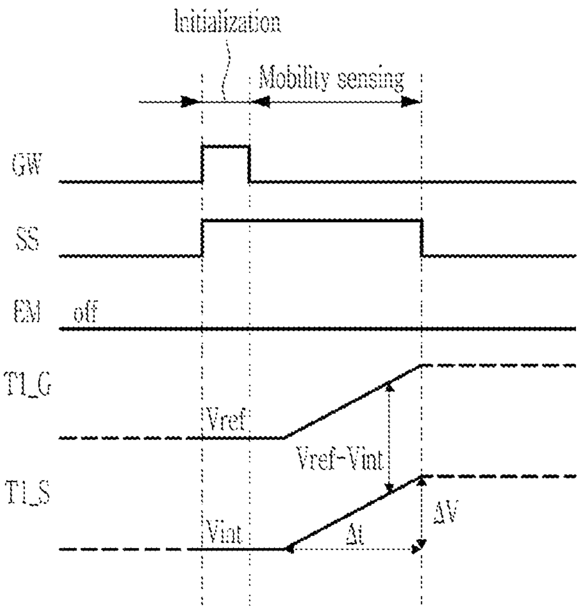
FIG. 5 illustrates a waveform diagram of an embodiment of a signal applied to the pixel of FIG. 1 for sensing mobility.
Figure 6:
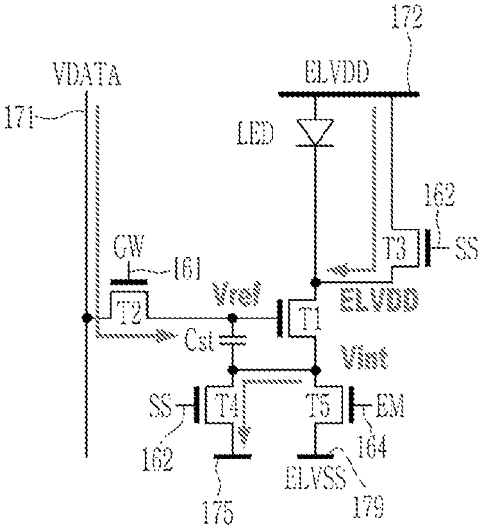
FIG. 6 and FIG. 7 illustrate drawings for explaining an operation of the pixel of FIG. 1 for each period based on the signal of FIG. 5.
Figure 7:
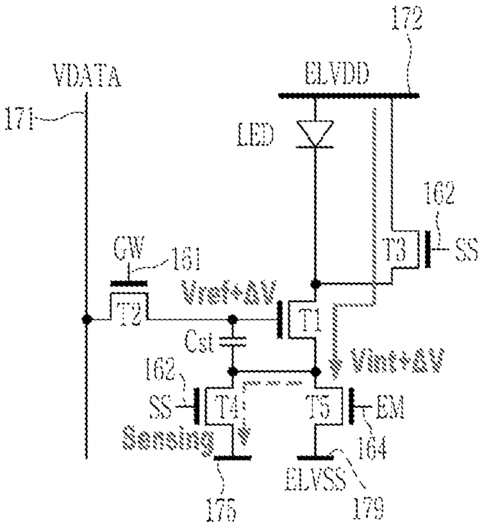

FIG. 5 illustrates a waveform diagram of an embodiment of a signal applied to the pixel of FIG. 1 for sensing mobility, and FIG. 6 and FIG. 7 illustrate drawings for explaining an operation of the pixel of FIG. 1 for each period based on the signal of FIG.

In FIG. 5, in addition to the waveform diagrams of the first scan signal GW, the second scan signal SS, and the light-emitting signal EM, according to these signals, voltage changes of the gate electrode and the second electrode of the first transistor T1 are shown as T1_G and T1_S.

The operation of sensing the charge mobility in the embodiment may include an initialization period and a mobility period as shown in FIG. 5.

First, the initialization period is a period in which an initialization voltage Vint initializes the second electrode of the storage capacitor Cst, the second electrode of the first transistor T1, and the first electrode of the fifth transistor T5 through the sensing line 175 and the fourth transistor T4. The initialization period is a period in which the mobility is set to a voltage value desired for a mobility sensing operation before the mobility is sensed.

Referring to FIG. 5, in the initialization period, the first scan signal GW and the second scan signal SS are applied as a gate-on voltage (a high level voltage), and the light-emitting signal EM is applied as a gate-off voltage (a low level voltage).

As a result, as shown in FIG. 6, the second transistor T2, the third transistor T3, and the fourth transistor T4 are in a turn on state, and the fifth transistor T5 is in a turn off state.

The reference voltage Vref applied to the data line 171 through the turned-on second transistor T2 is applied to the gate electrode of the first transistor T1 and the first electrode of the storage capacitor Cst, and the first driving voltage ELVDD is transmitted to the first electrode of the first transistor T1 through the turned-on third transistor T3. In addition, the initialization voltage Vint is applied from the sensing line 175 through the turned-on fourth transistor T4, so that the second electrode of the storage capacitor Cst, the second electrode of the first transistor T1, and the first electrode of the fifth transistor T5 are initialized to the initialization voltage Vint.

As a result, in the initialization period, as shown in T1_G of FIG. 5, the voltage of the gate electrode of the first transistor T1 has the same voltage value as the reference voltage Vref applied to data line 171, and as shown in T1_S of FIG. 5, the voltage of the second electrode of the first transistor T1 has the same voltage as the initialization voltage Vint applied to the sensing line 175.

Here, the initialization voltage Vint may have a relatively low level voltage value compared to the reference voltage Vref, and the reference voltage Vref may have a voltage value capable of turning on the first transistor T1. Since the reference voltage Vref is applied to the gate electrode in the initialization period, the first transistor T1 is in a turn on state, but since the initialization voltage Vint is applied to the second electrode of the first transistor T1, the voltage of the second electrode of the first transistor T1 is maintained at the initialization voltage Vint.

After that, the mobility sensing period is entered.

Referring to FIG. 5 and FIG. 7, in the mobility sensing period, the second scan signal SS is applied as a gate-on voltage (a high level voltage), and the first scan signal GW and the light-emitting signal EM are applied as a gate-off voltage (a low level voltage). That is, as the first scan signal GW is changed to the turn off state, the mobility sensing period proceeds. In this case, the sensing line 175 does not transmit the initialization voltage Vint, but it serves to transmit the voltages or currents of the second electrode of the first transistor T1 and the second electrode of the storage capacitor Cst.

Since the first scan signal GW is changed to the turn off state, the second transistor T2 is turned off, so that the reference voltage Vref is no longer transmitted to the gate electrode of the first transistor T1 and the first electrode of the storage capacitor Cst. Therefore, the voltage values of the gate electrode of the first transistor T1 and the first electrode of the storage capacitor Cst may be changed as the voltage value of the second electrode of the storage capacitor Cst is changed.

Specifically, referring to FIG. 5 and FIG. 7, even when the second transistor T2 is turned off, the voltage of the first electrode of the storage capacitor Cst is maintained as the reference voltage Vref, and thus the first transistor T1 is turned on. The output current of the turned-on first transistor T1 starts to be outputted to the second electrode of the first transistor T1 as the sensing line 175 no longer transmits the initialization voltage Vint while entering the mobility sensing period, and the voltages of the second electrode of the first transistor T1 and the second electrode of the storage capacitor Cst are increased. In this case, as the voltage of the second electrode of the storage capacitor Cst is changed, the voltage of the first electrode of the storage capacitor Cst is also changed. Here, when an amount of change in the voltage of the second electrode of the storage capacitor Cst is ΔV, the voltage of the first electrode of the storage capacitor Cst is changed by the maximum of ΔV. As a result, referring to FIG. 7, the voltage values of the first electrode of the storage capacitor Cst and the gate electrode may have a voltage value obtained by adding the voltage change amount ΔV to the voltage value of the reference voltage Vref, and the voltage values of the second electrode of the storage capacitor Cst and the second electrode of the first transistor T1 may have a voltage value obtained by adding the voltage change amount ΔV to the voltage value of the initialization voltage Vint.

Therefore, referring to FIG. 5, as the voltage of the second electrode of the first transistor T1 is changed as shown in T1_S of FIG. 5, the voltage of the gate electrode of the first transistor T1 is also changed as shown in T1_G of FIG. 5. In this case, as shown in FIG. 5, a value obtained by subtracting the voltage value of the second electrode of the first transistor T1 from the voltage value of the gate electrode may be a value obtained by subtracting the voltage value of the initialization voltage Vint from the voltage value of the reference voltage Vref.

The voltage of the second electrode of the first transistor T1 and the voltage of the gate electrode gradually increase, and when the second scan signal SS is changed to a gate-off voltage (a low-level voltage) and the mobility sensing period ends, they no longer increase.

The mobility of the first transistor T1 has a value proportional to a value obtained by dividing the voltage change amount ΔV of FIG. 5 by the time Δt, and after obtaining the voltage change amount ΔV and the time Δt value, the mobility may be calculated through Equation 1.

$$C\text{sense}\times(\Delta V/\Delta t)=\mu\times(C_{ox})\times(W/2L)\times(V_{ref}-V_{int}-V_{th\_T1})^2 \quad \text{(Equation 1)}$$

In Equation 1, μ denotes mobility of the first transistor, W denotes a width of the first transistor channel, L denotes a length of a channel of the first transistor, $V_{ref}$ denotes a reference voltage value, $V_{int}$ denotes an initialization voltage value, $V_{th\_t1}$ denotes a threshold voltage value of the first transistor, Csense denotes a capacitance value of a sensing operation part (refer to 220 in FIG. 22) that senses a voltage change ΔV, and $C_{ox}$ denotes a capacitance value per unit area of an insulating film included in the first transistor.

$$C_{ox}=\varepsilon/t \quad \text{(Equation 2)}$$

Here, ε denotes a dielectric constant of an insulating film, and t denotes a thickness of an insulating film.

According to Equation 1 and Equation 2 above, W, L, and $C_{ox}$ (that is, ε and t) values are values that may be confirmed by a designed size and a used material, $V_{ref}$ and $V_{int}$ are known values because they are voltages applied to the pixel, $V_{th\_T1}$ is a threshold voltage value measured through FIG. 2 to FIG. 4, and Csense is an intrinsic capacitance value of the sensing operation part. Therefore, by substituting all of these values, the mobility μ of the first transistor may be checked.

In some embodiments, the mobility of the first transistor T1 may be checked by detecting a current value transmitted to the sensing line 175. That is, since all values disposed at opposite sides of the equal sign in Equation 1 represent current values flowing through the sensing line 175, the mobility μ may be calculated by the measured current values.

In the above, the operation of sensing the mobility in the embodiment by the pixel of FIG. 1 has been described.

Hereinafter, an operation in which the data voltage VDATA corrected according to the sensed threshold voltage and mobility of the first transistor T1 is written into the pixel and the pixel emits light will be described.

Figure 9:
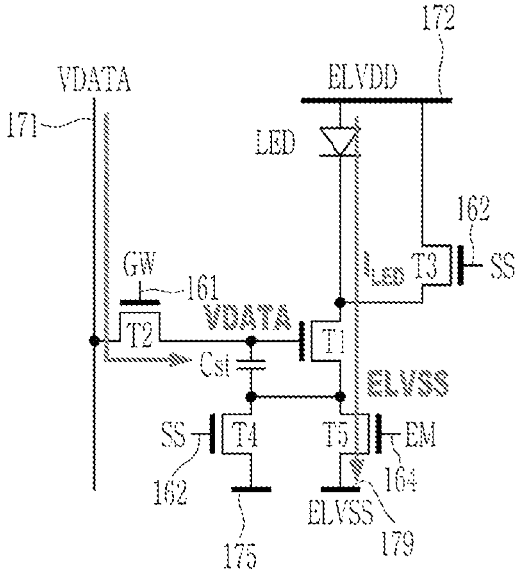
FIG. 9 illustrates a drawing for explaining an operation of the pixel of FIG. 1 based on the signal of FIG. 8.
Figure 10:
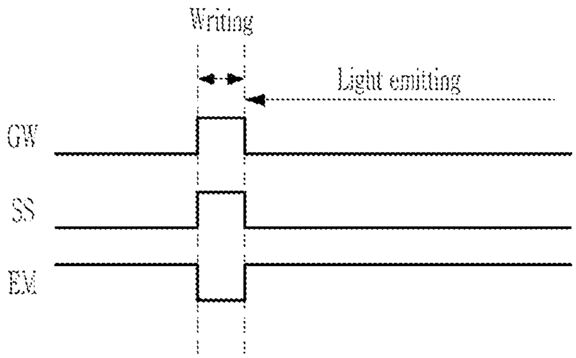
FIG. 10 illustrates a waveform diagram of another embodiment of a signal applied to the pixel of FIG. 1 for light-emitting
Figure 11:
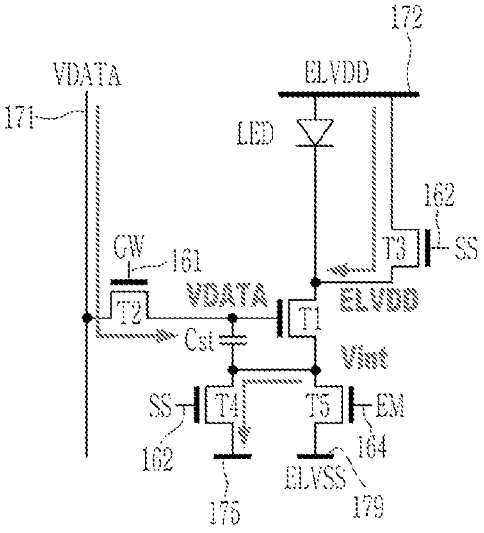
FIG. 11 and FIG. 12 illustrate drawings for explaining an operation of the pixel of FIG. 1 for each period based on the signal of FIG. 10.
Figure 12:
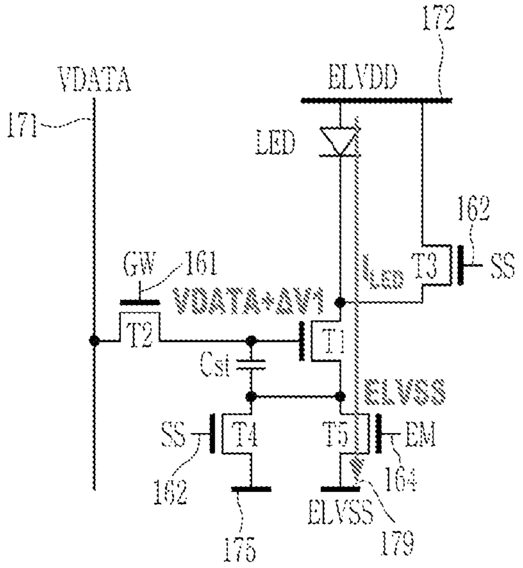

FIG. 10 to FIG. 12 illustrate writing and light-emitting operations according to two different embodiments, and first, writing and light-emitting operations in an embodiment will be described with reference to FIG. 8 and FIG. 9.

Figure 8:
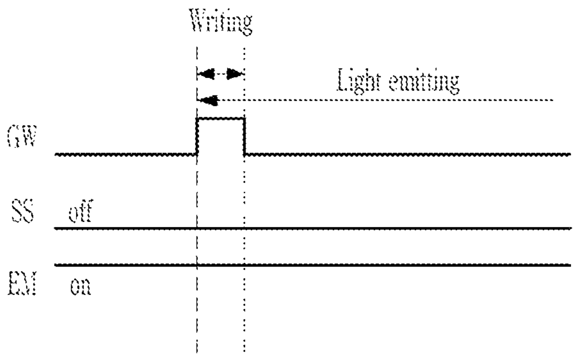
FIG. 8 illustrates a waveform diagram of an embodiment of a signal applied to the pixel of FIG. 1 for light-emitting.

FIG. 8 illustrates a waveform diagram of an embodiment of a signal applied to the pixel of FIG. 1 for light-emitting, and FIG. 9 illustrates a drawing for explaining an operation of the pixel of FIG. 1 based on the signal of FIG. 8.

FIG. 8 illustrates waveform diagrams of the first scan signal GW, the second scan signal SS, and the light-emitting signal EM, and it illustrates a writing period and a light-emitting period.

Referring to FIG. 8, in the writing period, the first scan signal GW and the light-emitting signal EM are applied as a gate-on voltage (a high level voltage), and the second scan signal SS is applied as a gate-off voltage (a low level voltage).

As a result, as shown in FIG. 9, the second transistor T2 and the fifth transistor T5 are in a turn on state, and the third transistor T3 and the fourth transistor T4 are in a turn off state.

The data voltage VDATA applied to the data line 171 through the turned-on second transistor T2 is applied to the gate electrode of the first transistor T1 and the first electrode of the storage capacitor Cst. In this case, since the fifth transistor T5 is turned on, the second driving voltage ELVSS is applied to the second electrode of the first transistor T1. Therefore, the first transistor T1 is turned on according to the data voltage VDATA transmitted to the gate electrode, and a current path is formed from the anode of the light-emitting element LED to which the first driving voltage ELVDD is applied to the second driving voltage line 179 through the first transistor T1. The light-emitting element LED emits light according to a current $I_{LED}$ flowing along the current path.

That is, in the embodiment of FIG. 8 and FIG. 9, when the data voltage VDATA is transmitted to the gate electrode, the current path is immediately formed and the light-emitting element LED emits light, so that the writing period and the light-emitting period may at least partially overlap.

Therefore, based on FIG. 8, only in the writing period, the first scan signal GW may be applied as the gate-on voltage, and in the writing period and the light-emitting period, the light-emitting signal EM may be applied as the gate-on voltage and the second scan signal SS may be applied as the gate-off voltage. Here, the writing period may proceed for one horizontal period 1H. The one horizontal period 1H may correspond to one horizontal synchronizing signal. The one horizontal period 1H may mean a time when the gate-on voltage is applied to a scan line of a next row after the gate-on voltage is applied to one scan line.

The current $I_{LED}$ flowing through the light-emitting element LED during the light-emitting period may have a value as in Equation 3 below.

$$I_{LED}=k/2\times(V_{data}-V_{ELVSS}-V_{th\_T1})^2 \quad \text{(Equation 3)}$$

Here, k denotes a constant value, $V_{data}$ denotes a voltage value of the data voltage, $V_{ELVSS}$ denotes a voltage value of the second driving voltage ELVSS, and $V_{th\_T1}$ denotes a threshold voltage value of the first transistor T1.

Among them, since the data voltage has a voltage value compensated according to the measured threshold voltage and mobility, in Equation 3, the threshold voltage value $V_{th\_T1}$ and the mobility value μ (included in k in Equation 3) of the first transistor T1 are substantially removed, and a constant output current $I_{LED}$ may be generated despite a change in the characteristics of the first transistor T1.

In order to end the light-emitting period, a gate-off voltage (a low level voltage) may be applied to the light-emitting signal EM, and then the initialization period may be performed, or the threshold voltage or mobility sensing may be performed, as in FIG. 2 and/or FIG. 5.

In some embodiments, the writing period and the light-emitting period may be divided, and these embodiments will be described with reference to FIG. 10 to FIG. 12.

FIG. 10 illustrates a waveform diagram of a signal applied to the pixel of FIG. 1 for light-emitting in another embodiment, and FIG. 11 and FIG. 12 illustrate drawings for explaining an operation of the pixel of FIG. 1 for each period based on the signal of FIG. 10.

FIG. 10 illustrates waveform diagrams of the first scan signal GW, the second scan signal SS, and the light-emitting signal EM, and it is divided into the writing period and the light-emitting period.

Referring to FIG. 10, in the writing period, the first scan signal GW and the second scan signal SS are applied as a gate-on voltage (a high level voltage), and the light-emitting signal EM is applied as a gate-off voltage (a low level voltage).

As a result, as shown in FIG. 11, the second transistor T2, the third transistor T3, and the fourth transistor T4 are in a turn on state, and the fifth transistor T5 is in a turn off state.

The data voltage VDATA applied to data line 171 through the turned-on second transistor T2 is applied to the gate electrode of the first transistor T1 and the first electrode of the storage capacitor Cst. In this case, the third transistor T3 is turned on, so that the first driving voltage ELVDD is applied to the first electrode of the first transistor T1. In addition, the fourth transistor T4 is also turned on, and the initialization voltage Vint is applied to the sensing line 175, so that the second electrode of the first transistor T1, the second electrode of the storage capacitor Cst, and the first electrode of the fifth transistor T5 are initialized. In this case, since the third transistor T3 is turned on, no current flows through the light-emitting element LED, and no light is emitted.

Thereafter, while the first scan signal GW and the second scan signal SS are changed to a gate-off voltage (a low-level voltage) and the emitting signal EM is changed to a gate-on voltage (a high-level voltage), the light-emitting period proceeds.

As a result, as shown in FIG. 12, a current path including the turned-on fifth transistor T5, the first transistor T1 turned on according to the data voltage VDATA, and the light-emitting element LED is formed. A degree at which the first transistor T1 is turned on is determined according to the data voltage VDATA, and accordingly, the current $I_{LED}$ flowing along the current path is also changed. The light-emitting element LED differently displays brightness according to an amount of the current $I_{LED}$ flowing along the current path.

In the light-emitting period of FIG. 10 to FIG. 12, the current $I_{LED}$ flowing through the light-emitting element LED may have a value as in Equation 4 below.

$$I_{LED}=k/2\times(V_{data}-V_{int}-V_{th\_T1})^2 \quad \text{(Equation 4)}$$

Here, k is a constant value, $V_{data}$ is a voltage value of the data voltage, $V_{int}$ is a voltage value of the initialization voltage Vint, and $V_{th\_T1}$ is a threshold voltage value of the first transistor T1.

Among them, since the data voltage has a voltage value compensated according to the measured threshold voltage and mobility, in Equation 4, the threshold voltage value $V_{th\_T1}$ and the mobility value μ (included in k in Equation 4) of the first transistor T1 are substantially removed, and a constant output current $I_{LED}$ may be generated despite a change in the characteristics of the first transistor T1. In addition, in Equation 4, a voltage value $V_{ELVSS}$ of the second driving voltage ELVSS is not included, and an output current that is not affected by a drop in the second driving voltage ELVSS may be generated.

Referring to FIG. 12, the voltages of the gate electrode of the first transistor T1 and the first electrode of the storage capacitor Cst in the light-emitting period are different from the voltages thereof in the writing period by ΔV1. These voltage changes are caused by the following reasons.

As the light-emitting period is entered, the fifth transistor T5 is turned on, and as a result, the voltages of the second electrode of the storage capacitor Cst and the second electrode of the first transistor T1 are changed to the second driving voltage ELVSS. Since the voltages of the second electrode of the first transistor T1 and the second electrode of the storage capacitor Cst are the initialization voltage Vint in the writing period, as the writing period is changed to the light-emitting period, a change value of the voltage of the second electrode of the storage capacitor Cst is a value obtained by subtracting the initialization voltage Vint from the second driving voltage ELVSS.

A change in the voltage of the second electrode of the storage capacitor Cst may change the voltage of the first electrode of the storage capacitor Cst, and the change value of the voltage of the first electrode of the storage capacitor Cst may be maximumly the same as the change value (a value obtained by subtracting the initialization voltage Vint from the second driving voltage ELVSS) of the voltage of the second electrode of the storage capacitor Cst. The change in the voltage of the first electrode of the storage capacitor Cst is illustrated as ΔV1 in FIG. 12, and a value of the ΔV1, when ΔVis a voltage value of the initialization voltage Vint and $V_{ELVSS}$ is a voltage value of the second driving voltage ELVSS, may have a value of $V_{ELVSS}-V_{int}$.

As described above, even when the voltage of the gate electrode is changed in the light-emitting period, referring to Equation 4, it may be confirmed that the current $I_{LED}$ flowing through the light-emitting element LED is not affected by ΔV1.

More specifically, the operation of deriving Equation 4 is described in detail as Equation 5 below.

$$
\begin{aligned}
I_{LED} &= k/2 \times (Vgs - V_{th\_T1})^2 \quad \text{(Equation 5)}\\
&= k/2 \times [(V_{data} + \Delta V1 - V_{ELVSS}) - V_{th\_T1}]^2\\
&= k/2 \times [(V_{data} + (V_{ELVSS} - V_{int}) - V_{ELVSS}) - V_{th\_T1}]^2\\
&= k/2 \times (V_{data} - V_{int} - V_{th\_T1})^2
\end{aligned}
$$

Here, k denotes a constant value, $V_{data}$ denotes a voltage value of the data voltage, $V_{int}$ denotes a voltage value of the initialization voltage Vint, $V_{th\_T1}$ denotes a threshold voltage value of the first transistor T1, $V_{ELVSS}$ denotes a voltage value of the second driving voltage ELVSS, and Vgs denotes a voltage difference between the gate electrode and the second electrode of the first transistor T1.

Referring to Equation 5 above, since ΔV1 is removed, there is no need to separately consider it, and since the threshold voltage and mobility of the first transistor T1 are reflected in the data voltage VDATA, the light-emitting element LED may appropriately express a desired luminance. In addition, in Equation 5, the voltage value $V_{ELVSS}$ of the second driving voltage ELVSS is not included, and it may be seen that the current flowing through the light-emitting element LED is not affected by a drop in the second driving voltage ELVSS.

In order to end the light-emitting period, a gate-off voltage (a low level voltage) may be applied to the light-emitting signal EM, and then the initialization period may be performed, or the threshold voltage or mobility sensing may be performed, as in FIG. 2 and/or FIG. 5.

The pixel in the embodiment of FIG. 1 may be driven while FIG. 2, FIG. 5, and FIG. 8 are sequentially applied, or may be driven while FIG. 2, FIG. 5, and FIG. 10 are sequentially applied. However, as another variation, some periods may be removed, and the threshold voltage or mobility sensing may be performed once every time a plurality of light-emitting periods is performed.

In the above, the voltage value of the first driving voltage ELVDD is set to be greater than a value obtained by subtracting the threshold voltage value of the first transistor T1 from the voltage value of the reference voltage Vref, and the voltage value of the second driving voltage ELVSS is set to be smaller than a value obtained by subtracting the threshold voltage value of the first transistor T1 from the voltage value of the reference voltage Vref.

In the above, various driving methods based on the pixel of FIG. 1 have been described.

Hereinafter, a pixel shown in FIG. 13 will be described.

Figure 13:
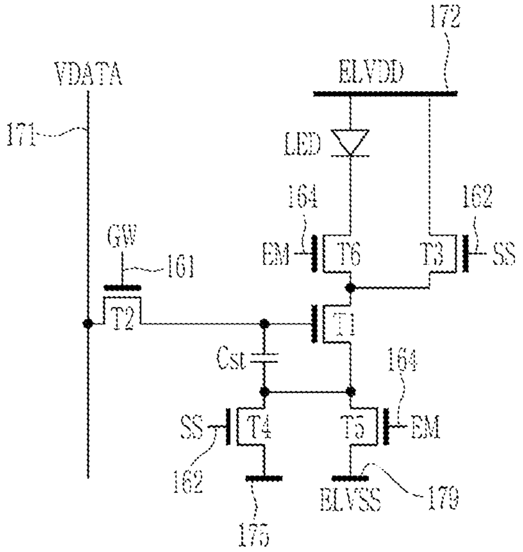
FIG. 13 illustrates an equivalent circuit diagram of an embodiment of one pixel included in a light-emitting display device.

FIG. 13 illustrates an embodiment of an equivalent circuit diagram of one pixel included in a light-emitting display device.

Unlike the pixel of FIG. 1, the pixel of FIG. 13 has a structure that additionally includes a sixth transistor T6.

That is, a pixel driving circuit of the pixel in the embodiment of FIG. 13 further includes the sixth transistor T6, the sixth transistor T6 is disposed between the light-emitting element LED and the first electrode of the first transistor T1 to connect the cathode of the light-emitting element LED and the first transistor T1.

The sixth transistor T6 (hereinafter also referred to as a cathode-connected transistor) includes a gate electrode connected to the emitting signal line 164 to which the light-emitting signal EM is applied, a first electrode connected to the cathode of the light-emitting element LED, and a second electrode connected to the first electrode of the first transistor T1 and the second electrode of the third transistor T3. The sixth transistor T6 may connect the first electrode of the first transistor T1 and the light-emitting element LED based on the light-emitting signal EM to form a current path and to allow the light-emitting element LED to emit light.

In the embodiment of FIG. 13, all the transistors are formed as n-type transistors, and each transistor may be turned on when the voltage of the gate electrode is a high level voltage, and may be turned off when the voltage of the gate electrode is a low level voltage. In addition, a semiconductor layer included in each transistor may use a polycrystalline silicon semiconductor or an oxide semiconductor, and may additionally use an amorphous semiconductor or a single crystal semiconductor.

In some embodiments, the semiconductor layer included in each transistor may further include an overlapping layer (or an additional gate electrode) overlapping it, and by applying a voltage to the overlapping layer (the additional gate electrode) to change characteristics of the transistor, it is possible to further improve the display quality of the pixel.

An operation of the pixel in the embodiment of FIG. 13 may be substantially the same as the operation of the pixel of FIG. 1, and may perform the same and similar operation as that of FIG. 2 to FIG. 12.

That is, the sixth transistor T6 added in FIG. 13 is turned on only according to the light-emitting signal EM, and operates at the same timing as the fifth transistor T5.

Referring to FIG. 2 to FIG. 7, since the light-emitting signal EM applies a gate-off voltage (a low level voltage), like the fifth transistor T5, the sixth transistor T6 is also turned off.

Referring to FIG. 8 to FIG. 12, since the light-emitting signal EM in the light-emitting period applies a gate-on voltage (a high level voltage), like the fifth transistor T5, the sixth transistor T6 is also turned on, and a current path is formed from the anode of the light-emitting element LED to which the first driving voltage ELVDD is applied to the second driving voltage line 179 through the first transistor T1.

The pixel in the embodiment of FIG. 13 may have the same advantages as the pixel of FIG. 1.

In an embodiment, by applying a data voltage VDATA corrected by reflecting the sensed threshold voltage and/or mobility, it is possible to emit a constant luminance even when the characteristic of the first transistor T1 is changed.

In addition, even when the voltage of the gate electrode of the first transistor T1 is changed while the second driving voltage ELVSS is applied, the first transistor T1 may ignore it and generate a constant output current.

In addition, it is possible to form a pixel with high resolution in the same area by reducing the area occupied by the pixel by sensing the threshold voltage and/or mobility from the outside of the pixel.

Figure 14:
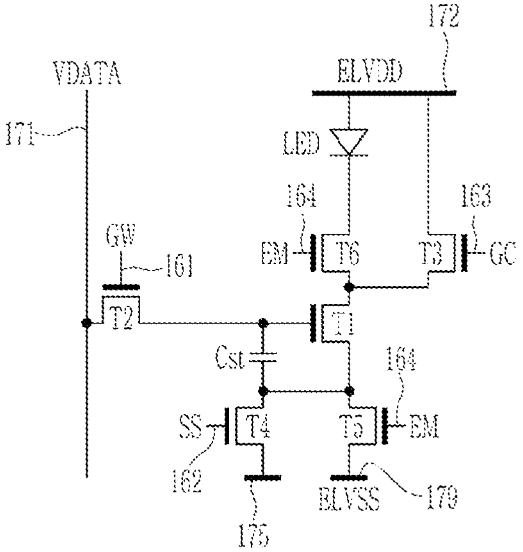
FIG. 14 illustrates an equivalent circuit diagram of an embodiment of one pixel included in a light-emitting display device.

The pixel of FIG. 13 may be deformed like a pixel of FIG. 14, and the pixel of FIG. 14 includes a separate signal (a third scan signal GC) for controlling the third transistor T3 unlike the pixel of FIG. 13.

Hereinafter, a structure and operation of the pixel of FIG. 14 will be described in detail with reference to FIG. 15 to FIG. 18 together with FIG. 14.

First, a circuit structure of the pixel will be described with reference to FIG. 14.

FIG. 14 illustrates an equivalent circuit diagram of an embodiment of one pixel included in a light-emitting display device.

Referring to FIG. 14, one pixel includes a light-emitting element LED and a pixel driving circuit for driving the same, and the pixel driving circuit is arranged in a matrix form. The pixel driving circuit includes all elements except for the light-emitting element LED in FIG. 14, and the pixel driving circuit of the pixel in the embodiment of FIG. 14 includes a first transistor T1, a second transistor T2, a third transistor T3, a fourth transistor T4, a fifth transistor T5, a sixth transistor T6, and a storage capacitor Cst.

In addition, the pixel driving circuit may be connected to a first scan line 161 to which a first scan signal GW is applied, a second scan line 162 to which a second scan signal SS is applied, a third scan line 163 to which a third scan signal GC is applied, a light-emitting signal line 164 to which a light-emitting signal EM is applied, and a data line 171 to which a data voltage VDATA or a reference voltage Vref is applied. In addition, the pixel may be connected to a first driving voltage line 172 to which a first driving voltage ELVDD is applied, a second driving voltage line 179 to which a second driving voltage ELVSS is applied, and a sensing line 175 connected to an initialization and sensing operation part performing an initialization and sensing operations (refer to FIG. 22).

A structure of the pixel will now be described focusing on respective elements (the transistors, the capacitor, and the light-emitting element) included in the pixel as follows.

The first transistor T1 includes a gate electrode connected to a first electrode of the storage capacitor Cst, a first electrode (an input-side electrode) connected to a second electrode of the sixth transistor T6 and a second electrode of the third transistor T3, and a second electrode (an output-side electrode) connected to a second electrode of the fourth transistor T4, a second electrode of the storage capacitor Cst, and a first electrode of the fifth transistor T5.

In the first transistor T1, a degree to which the first transistor T1 is turned on is determined according to a voltage of the gate electrode thereof, and an amount of a current flowing from the first electrode to the second electrode of the first transistor T1 according to the turned on degree is determined. The current flowing from the first electrode to the second electrode of the first transistor T1 is the same as a current flowing through the light-emitting element LED, so it may be also referred to as a light-emitting current. Here, the first transistor T1 is formed as an n-type transistor, and as a voltage of the gate electrode thereof increases, a substantially large light-emitting current may flow. When the light-emitting current is substantially large, the light-emitting element LED may display substantially high luminance.

The second transistor T2 (hereinafter also referred to as a data input transistor) includes a gate electrode connected to the first scan line 161 to which the first scan signal GW is applied, a first electrode (an input-side electrode) connected to the data line 171 to which the data voltage VDATA and the reference voltage Vref are applied, and a second electrode (an output-side electrode) connected to the first electrode of the storage capacitor Cst and the gate electrode of the first transistor T1. The second transistor T2 inputs the data voltage VDATA and the reference voltage Vref into the pixel according to the first scan signal GW to transmit them to the gate electrode of the first transistor T1 and to store them in the first electrode of the storage capacitor Cst.

The third transistor T3 (hereinafter also referred to as a driving voltage transmitting transistor) includes a gate electrode connected to the third scan line 163 to which the third scan signal GC is applied, a first electrode (an input-side electrode) connected to the first driving voltage line 172, and a second electrode (an output-side electrode) connected to the first electrode of the first transistor T1 and the second electrode of the sixth transistor T6. The third transistor T3 allows the first driving voltage ELVDD to be transmitted to the first transistor T1 without passing through the light-emitting element LED. This is to transmit the first driving voltage ELVDD to the first transistor T1 through a separate path since a problem that the light-emitting element LED unnecessarily emits light when a current flows through the light-emitting element LED may occur. Therefore, the third transistor T3 may not be turned on during a light-emitting period, and may be turned on during other periods.

The fourth transistor T4 (hereinafter also referred to as a sensing transistor) includes a gate electrode connected to the second scan line 162 to which the second scan signal SS is applied, a first electrode connected to the sensing line 175, and a second electrode connected to the second electrode of the first transistor T1, the first electrode of the fifth transistor T5, and the second electrode of the storage capacitor Cst.

The fourth transistor T4 is a transistor configuring a path for sensing the threshold voltage and/or charge mobility of the first transistor T1, and may additionally initialize the second electrode of the storage capacitor Cst. As a result, the fourth transistor T4 may be also referred to as an initialization transistor in addition to the sensing transistor. Therefore, the sensing line 175 may be divided into a section for transmitting the initialization voltage Vint and a section for sensing the voltage or current of the second electrode of the first transistor T1 or the second electrode of the storage capacitor Cst. Like the third transistor T3, the fourth transistor T4 may not be turned on during the light-emitting period, and may be turned on during other periods.

The fifth transistor T5 (hereinafter also referred to as a driving low voltage-applying transistor) includes a gate electrode connected to the light-emitting signal line 164 to which the light-emitting signal EM is applied, a first electrode connected to the second electrode of the first transistor T1, the second electrode of the fourth transistor T4, and the second electrode of the storage capacitor Cst, and a second electrode receiving the second driving voltage ELVSS.

The sixth transistor T6 (hereinafter also referred to as a cathode-connected transistor) includes a gate electrode connected to the emitting signal line 164 to which the light-emitting signal EM is applied, a first electrode connected to the cathode of the light-emitting element LED, and a second electrode connected to the first electrode of the first transistor T1 and the second electrode of the third transistor T3. The fifth transistor T5 may transmit the second driving voltage ELVSS to the second electrode of the first transistor T1 based on the light-emitting signal EM, and the sixth transistor T6 may connect the first electrode of the first transistor T1 and the light-emitting element LED based on the light-emitting signal EM to form a current path and to allow the light-emitting element LED to emit light.

In the embodiment of FIG. 14, all the transistors are formed as n-type transistors, and each transistor may be turned on when the voltage of the gate electrode is a high level voltage, and may be turned off when the voltage of the gate electrode is a low level voltage. In addition, a semiconductor layer included in each transistor may use a polycrystalline silicon semiconductor or an oxide semiconductor, and may additionally use an amorphous semiconductor or a single crystal semiconductor.

In some embodiments, the semiconductor layer included in each transistor may further include an overlapping layer (or an additional gate electrode) overlapping it, and by applying a voltage to the overlapping layer (the additional gate electrode) to change characteristics of the transistor, it is possible to further improve the display quality of the pixel.

The storage capacitor Cst includes a first electrode connected to the gate electrode of the first transistor T1 and the second electrode of the second transistor T2, and a second electrode connected to the second electrode of the fourth transistor T4 and the first electrode of the fifth transistor T5. The first electrode of the storage capacitor Cst receives the data voltage VDATA or the reference voltage Vref from the second transistor T2 to store it. The second electrode of the storage capacitor Cst may be initialized by a voltage (the initialization voltage Vint) transmitted from the sensing line 175 through the fourth transistor T4, and may store a voltage to sense a threshold voltage or configure a path through which a current passes to sense mobility.

The light-emitting element LED includes an anode connected to the first driving voltage line 172 to receive the first driving voltage ELVDD, and a cathode connected to the first electrode of the sixth transistor T6. The light-emitting element LED is disposed between the pixel driving circuit and the first driving voltage ELVDD, and the same current as the current flowing through the first transistor T1 of the pixel driving circuit flows in it, and luminance at which it emits light may also be determined according to an amount of a corresponding current. The light-emitting element LED may include a light-emitting layer including at least one of an organic light-emitting material and an inorganic light-emitting material between the anode and the cathode. A detailed stacked structure of the light-emitting element LED in the embodiment will be described with reference to FIG. 23 and FIG. 24.

The pixel in the embodiment of FIG. 14 senses a change in the characteristic (threshold voltage and/or charge mobility) of the first transistor T1 in a separate configuration (e.g., a sensing operation part of FIG. 22) disposed outside the pixel, and then may change the data voltage VDATA according to the sensed result to apply it to the pixel. That is, the pixel in the illustrated embodiment does not include a structure for compensating the threshold voltage of the first transistor T1. In the illustrated embodiment, since characteristics of the first transistor T1 such as the charge mobility may be considered in addition to the change in the threshold voltage, the change in the characteristics of the first transistor T1 may be sensed in more detail, and accordingly, the first transistor T1 may be operated. As a result, the first transistor T1 may more precisely and accurately generate an output current, and display quality may be improved.

In addition, since each pixel does not include a structure for compensating for the threshold voltage of the first transistor T1, an area occupied by the pixel driving circuit may be small, and even when an area of the light-emitting display device is the same, more pixels may be formed, and the display screen may also have a higher resolution.

In addition, in FIG. 14, the light-emitting element LED is disposed between the first electrode of the first transistor T1 and the first driving voltage line 172. The light-emitting element displays luminance according to an amount of a current flowing in a current path connected from the first driving voltage ELVDD to the second driving voltage ELVSS through the first transistor T1, and as the amount of the current increases, the displayed luminance may increase. In the inverted pixel structure of FIG. 14, since the first electrode of the first transistor T1 is connected to the light-emitting element LED, and is separated from the second electrode (source electrode) of the first transistor T1, when a voltage of each part of the pixel driving circuit is changed, a voltage of the second electrode (source electrode) of the first transistor T1 may not be changed.

In the embodiment of FIG. 14, it has been described that one pixel PX includes six transistors T1 to T6 and one capacitor (the storage capacitor Cst), but the invention is not limited thereto, and in some embodiments, an additional capacitor or transistor may be further included, and some capacitors or transistors may be omitted.

In the above, the circuit structure of the pixel in the embodiment has been described with reference to FIG. 14.

Hereinafter, a waveform of a signal applied to the pixel of FIG. 14 and an operation of the pixel according to the waveform will be described with reference to FIG. 15 to FIG. 18.

The pixel of FIG. 14 may perform an operation for sensing a threshold voltage, an operation for sensing mobility, a writing operation, and a light-emitting operation, and first, an operation for sensing a threshold voltage in an embodiment will be described with reference to FIG. 15.

Figure 15:
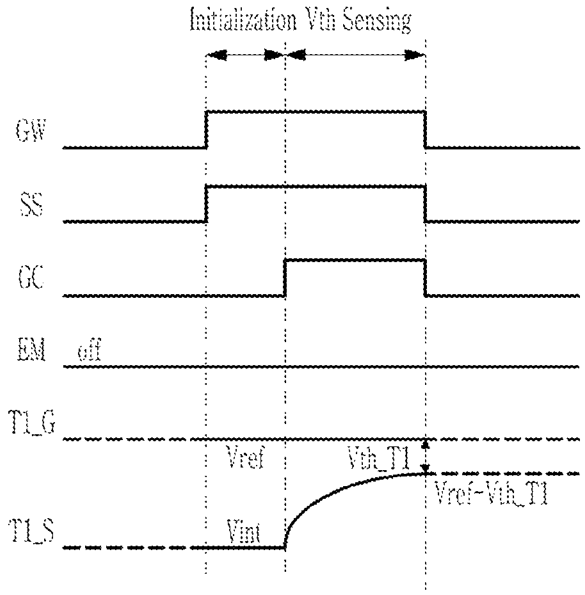
FIG. 15 illustrates a waveform diagram of an embodiment of a signal applied to the pixel of FIG. 14 for sensing a threshold voltage.

FIG. 15 illustrates a waveform diagram of a signal applied to the pixel of FIG. 14 for sensing a threshold voltage in an embodiment.

In FIG. 15, in addition to the waveform diagrams of the first scan signal GW, the second scan signal SS, the third scan signal GC, and the light-emitting signal EM, according to these signals, voltage changes of the gate electrode and the second electrode of the first transistor T1 are shown as T1_G and T1_S.

The operation of sensing the threshold voltage in the embodiment may include an initialization period and a threshold voltage sensing period for sensing the threshold voltage Vth.

First, the initialization period is a period in which an initialization voltage Vint initializes the second electrode of the storage capacitor Cst, the second electrode of the first transistor T1, and the first electrode of the fifth transistor T5 through the sensing line 175 and the fourth transistor T4. The initialization period is a period in which the threshold voltage is set to a voltage value desired for a threshold voltage sensing operation before the threshold voltage is sensed.

Referring to FIG. 15, in the initialization period, the first scan signal GW and the second scan signal SS are applied as a gate-on voltage (a high level voltage), and the third scan signal GC and the light-emitting signal EM are applied as a gate-off voltage (a low level voltage).

As a result, the second transistor T2 and the fourth transistor T4 are turned on, and the third transistor T3, the fifth transistor T5, and the sixth transistor T6 are turned off.

The reference voltage Vref applied to data line 171 through the turned-on second transistor T2 is applied to the gate electrode of the first transistor T1 and the first electrode of the storage capacitor Cst. In addition, the initialization voltage Vint is applied from the sensing line 175 through the turned-on fourth transistor T4, so that the second electrode of the storage capacitor Cst, the second electrode of the first transistor T1, and the first electrode of the fifth transistor T5 are initialized to the initialization voltage Vint.

As a result, in the initialization period, as shown in T1_G of FIG. 2, the voltage of the gate electrode of the first transistor T1 has the same voltage value as the reference voltage Vref applied to data line 171, and as shown in T1_S of FIG. 2, the voltage of the second electrode of the first transistor T1 has the same voltage as the initialization voltage Vint applied to the sensing line 175.

Here, the initialization voltage Vint may have a relatively low level voltage value compared to the reference voltage Vref, and the reference voltage Vref may have a voltage value capable of turning on the first transistor T1. However, since the third transistor T3 is turned off, the first transistor T1 does not receive the first driving voltage ELVDD, so it may be turned on.

After that, the threshold voltage sensing period for sensing the threshold voltage Vth is entered.

Referring to FIG. 15, the period of sensing the threshold voltage Vth is entered while the third scan signal GC is changed to a gate-on voltage (high level voltage). In addition, the sensing line 175 no longer transmits the initialization voltage Vint.

The first driving voltage ELVDD is transmitted to the first electrode of the first transistor T1 by the third scan signal GC, and the first transistor T1 is turned on by the reference voltage Vref already transmitted to the gate electrode thereof.

As a result, as shown in T1_S of FIG. 15, in the threshold voltage sensing period for sensing the threshold voltage Vth, when the voltage value of the second electrode of the first transistor T1 gradually increases until it reaches a voltage obtained by subtracting a threshold voltage value Vth_T1 of the first transistor from the reference voltage Vref, the voltage no longer increases.

That is, the first transistor T1 is maintained in the turned-on state when the voltage of the gate electrode is higher than the voltage of the second electrode of the first transistor T1 by at least a threshold voltage. Then, as the voltage of the second electrode of the first transistor T1 gradually increases, when a value obtained by subtracting the second electrode of the first transistor T1 from the voltage of the gate electrode is the threshold voltage value of the threshold voltage Vth of the first transistor T1, the first transistor T1 is turned off. Accordingly, the voltage (Vref-Vth_T1) when the first transistor T1 is turned off is stored in the second electrode of the storage capacitor Cst. A sensing operation part (refer to FIG. 22) connected to the sensing line 175 checks the voltage value of the second electrode of the storage capacitor Cst, and then by removing the known reference voltage Vref, it may check the threshold voltage value of the threshold voltage Vth of the first transistor T1. In this case, the sensing line 175 does not transmit the initialization voltage Vint, but it serves to transmit the voltages or currents of the second electrode of the first transistor T1 and the second electrode of the storage capacitor Cst.

In the above, the operation of sensing the threshold voltage in the embodiment by the pixel of FIG. 14 has been described.

Hereinafter, an operation of sensing mobility in an embodiment will be described with reference to FIG. 16.

Figure 16:
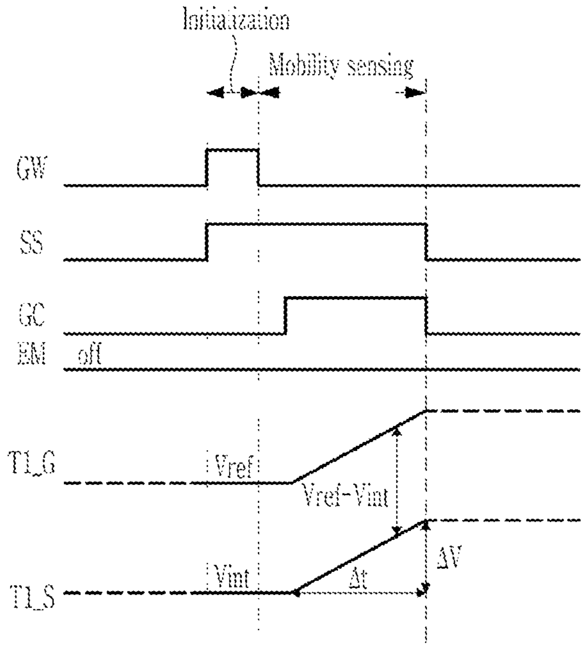
FIG. 16 illustrates a waveform diagram of an embodiment of a signal applied to the pixel of FIG. 14 for sensing mobility.

FIG. 16 illustrates a waveform diagram of a signal applied to the pixel of FIG. 14 for sensing mobility in an embodiment.

In FIG. 16, in addition to the waveform diagrams of the first scan signal GW, the second scan signal SS, the third scan signal GC, and the light-emitting signal EM, according to these signals, voltage changes of the gate electrode and the second electrode of the first transistor T1 are shown as T1_G and T1_S.

The operation of sensing the charge mobility in the embodiment may include an initialization period and a mobility period.

First, the initialization period is a period in which an initialization voltage Vint initializes the second electrode of the storage capacitor Cst, the second electrode of the first transistor T1, and the first electrode of the fifth transistor T5 through the sensing line 175 and the fourth transistor T4, and in which the reference voltage Vref is applied to the gate electrode of the first transistor T1 and the first electrode of the storage capacitor Cst. The initialization period is a period in which the mobility is set to a voltage value desired for a mobility sensing operation before the mobility is sensed.

Referring to FIG. 16, in the initialization period, the first scan signal GW and the second scan signal SS are applied as a gate-on voltage (a high level voltage), and the third scan signal GC and the light-emitting signal EM are applied as a gate-off voltage (a low level voltage).

As a result, the second transistor T2 and the fourth transistor T4 are turned on, and the third transistor T3, the fifth transistor T5, and the sixth transistor T6 are turned off.

The reference voltage Vref applied to the data line 171 through the turned-on second transistor T2 is applied to the gate electrode of the first transistor T1 and the first electrode of the storage capacitor Cst. In addition, the initialization voltage Vint is applied from the sensing line 175 through the turned-on fourth transistor T4, so that the second electrode of the storage capacitor Cst, the second electrode of the first transistor T1, and the first electrode of the fifth transistor T5 are initialized to the initialization voltage Vint.

As a result, in the initialization period, as shown in T1_G of FIG. 16, the voltage of the gate electrode of the first transistor T1 has the same voltage value as the reference voltage Vref applied to the data line 171, and as shown in T1_S of FIG. 16, the voltage of the second electrode of the first transistor T1 has the same voltage as the initialization voltage Vint applied to the sensing line 175.

Here, the initialization voltage Vint may have a relatively low level voltage value compared to the reference voltage Vref, and the reference voltage Vref may have a voltage value capable of turning on the first transistor T1. However, since the third transistor T3 is turned off, the first transistor T1 does not receive the first driving voltage ELVDD, so it may be turned on.

After that, the mobility sensing period is entered.

Referring to FIG. 16, when the first scan signal GW is changed to the gate-off voltage (low level voltage) and then the third scan signal GC is changed to the gate-on voltage (high level voltage), the mobility sensing period is entered. In addition, the sensing line 175 no longer transmits the initialization voltage Vint. In this case, the sensing line 175 does not transmit the initialization voltage Vint, but it serves to transmit the voltages or currents of the second electrode of the first transistor T1 and the second electrode of the storage capacitor Cst.

Since the first scan signal GW is changed to the turn off state, the second transistor T2 is turned off, so that the reference voltage Vref is no longer transmitted to the gate electrode of the first transistor T1 and the first electrode of the storage capacitor Cst. Therefore, the voltage values of the gate electrode of the first transistor T1 and the first electrode of the storage capacitor Cst may be changed as the voltage value of the second electrode of the storage capacitor Cst is changed.

The first driving voltage ELVDD is transmitted to the first electrode of the first transistor T1 by the third scan signal GC, and the first transistor T1 is turned on by the reference voltage Vref already transmitted to the gate electrode thereof. The output current of the turned-on first transistor T1 starts to be outputted to the second electrode of the first transistor T1 as the sensing line 175 no longer transmits the initialization voltage Vint while entering the mobility sensing period, and the voltages of the second electrode of the first transistor T1 and the second electrode of the storage capacitor Cst are increased. In this case, as the voltage of the second electrode of the storage capacitor Cst is changed, the voltage of the first electrode of the storage capacitor Cst is also changed. Here, when an amount of change in the voltage of the second electrode of the storage capacitor Cst is ΔV, the voltage of the first electrode of the storage capacitor Cst is changed by the maximum of ΔV. As a result, the voltage values of the first electrode of the storage capacitor Cst and the gate electrode may have a voltage value obtained by adding the voltage change amount ΔV to the voltage value of the reference voltage Vref, and the voltage values of the second electrode of the storage capacitor Cst and the second electrode of the first transistor T1 may have a voltage value obtained by adding the voltage change amount ΔV to the voltage value of the initialization voltage Vint.

Therefore, as the voltage of the second electrode of the first transistor T1 is changed as shown in T1_S of FIG. 16, the voltage of the gate electrode of the first transistor T1 is also changed as shown in T1_G of FIG. 16. In this case, as shown in FIG. 16, a value obtained by subtracting the voltage value of the second electrode of the first transistor T1 from the voltage value of the gate electrode may be a value obtained by subtracting the voltage value of the initialization voltage Vint from the voltage value of the reference voltage Vref.

The voltage of the second electrode of the first transistor T1 and the voltage of the gate electrode gradually increase, and when the second scan signal SS and the third scan signal GC are changed to a gate-off voltage (a low-level voltage) and the mobility sensing period ends, they no longer increase.

The mobility of the first transistor T1 has a value proportional to a value obtained by dividing the voltage change amount ΔV of FIG. 16 by the time Δt, and the mobility may be calculated by Equation 1 described above. That is, the mobility μ of the first transistor may be calculated by obtaining the voltage change amount ΔV and the time Δt and substituting them in Equation 1. In some embodiments, the mobility μ of the first transistor may be checked by sensing a current value transmitted to the sensing line 175.

In the above, the operation of sensing the mobility in the embodiment by the pixel of FIG. 14 has been described.

Figure 17:
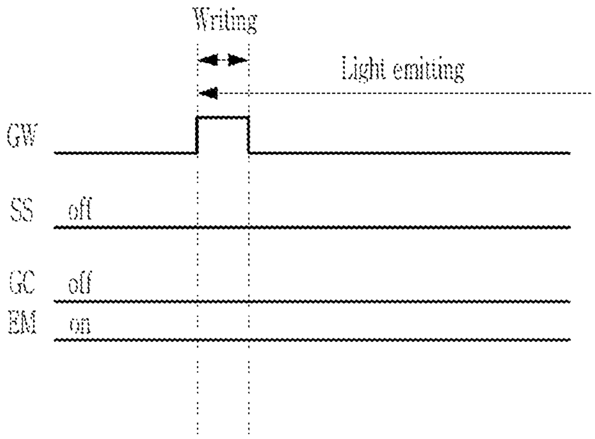
FIG. 17 illustrates a waveform diagram of an embodiment of a signal applied to the pixel of FIG. 14 for light-emitting.
Figure 18:
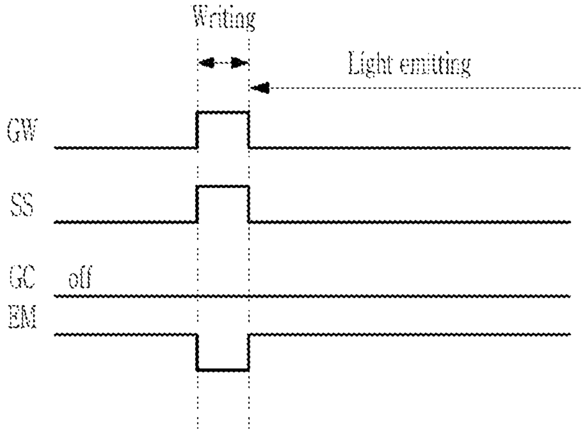
FIG. 18 illustrates a waveform diagram of another embodiment of a signal applied to the pixel of FIG. 14 for light-emitting.

Hereinafter, an operation in which the data voltage VDATA corrected according to the sensed threshold voltage and mobility of the first transistor T1 is written into the pixel and the pixel emits light will be described, and FIG. 17 and FIG. 18 illustrate embodiments of writing and light-emitting operations.

First, an operation of writing and emitting light in the embodiment of FIG. 17 will be described.

FIG. 17 illustrates a waveform diagram of a signal applied to the pixel of FIG. 14 for light-emitting in an embodiment.

FIG. 17 illustrates waveform diagrams of the first scan signal GW, the second scan signal SS, the third scan signal GC, and the light-emitting signal EM, and it illustrates a writing period and a light-emitting period.

Referring to FIG. 17, in the writing period, the first scan signal GW and the light-emitting signal EM are applied as a gate-on voltage (a high level voltage), and the second scan signal SS and the third scan signal GC are applied as a gate-off voltage (a low level voltage). As a result, the second transistor T2, the fifth transistor T5, and the sixth transistor T6 are turned on, and the third transistor T3 and the fourth transistor T4 are turned off.

The data voltage VDATA applied to data line 171 through the turned-on second transistor T2 is applied to the gate electrode of the first transistor T1 and the first electrode of the storage capacitor Cst. In this case, since the fifth transistor T5 and the sixth transistor T6 are turned on, the second driving voltage ELVSS is applied to the second electrode of the first transistor T1, and the first electrode of the first transistor T1 is connected to the cathode of the light-emitting element LED. Therefore, the first transistor T1 is turned on according to the data voltage VDATA transmitted to the gate electrode, and a current path is formed from the anode of the light-emitting element LED to which the first driving voltage ELVDD is applied to the second driving voltage line 179 through the first transistor T1. The light-emitting element LED emits light according to a current $I_{LED}$ flowing along the current path.

That is, in the embodiment of FIG. 17, when the data voltage VDATA is transmitted to the gate electrode, the current path is immediately formed and the light-emitting element LED emits light, so that the writing period and the light-emitting period may at least partially overlap.

Therefore, based on FIG. 17, only in the writing period, the first scan signal GW may be applied as the gate-on voltage, and in the writing period and the light-emitting period, the light-emitting signal EM may be applied as the gate-on voltage and the second scan signal SS and the third scan signal GC may be applied as the gate-off voltage. Here, the writing period may proceed for one horizontal period 1H.

The current $I_{LED}$ flowing through the light-emitting element LED during the light-emitting period of FIG. 17 may have the same value as Equation 3 described above, and since the applied data voltage VDATA has a compensated voltage value according to the measured threshold voltage and mobility, the threshold voltage value $V_{th\_T1}$ and the mobility value μ (included in k in Equation 3) of the first transistor T1 may be substantially removed in Equation 3, and a constant output current $I_{LED}$ may be generated despite a change in the characteristics of the first transistor T1. As a result, a constant luminance may be emitted even from various pixels having different characteristics of the first transistor T1.

In order to end the light-emitting period, a gate-off voltage (a low level voltage) may be applied to the light-emitting signal EM, and then the initialization period may be performed, or the threshold voltage or mobility sensing may be performed, as in FIG. 15 and/or FIG. 16.

In some embodiments, the writing period and the light-emitting period may be divided, and these embodiments will be described with reference to FIG. 18.

FIG. 18 illustrates a waveform diagram of another embodiment of a signal applied to the pixel of FIG. 14 for light-emitting.

FIG. 18 illustrates waveform diagrams of the first scan signal GW, the second scan signal SS, the third scan signal GC, and the light-emitting signal EM, and it is divided into the writing period and the light-emitting period.

Referring to FIG. 18, in the writing period, the first scan signal GW and the second scan signal SS are applied as a gate-on voltage (a high level voltage), and the third scan signal GC and the light-emitting signal EM are applied as a gate-off voltage (a low level voltage). As a result, the second transistor T2 and the fourth transistor T4 are turned on, and the third transistor T3, the fifth transistor T5, and the sixth transistor T6 are turned off.

The data voltage VDATA applied to data line 171 through the turned-on second transistor T2 is applied to the gate electrode of the first transistor T1 and the first electrode of the storage capacitor Cst. In addition, the fourth transistor T4 is also turned on, and the initialization voltage Vint is applied to the sensing line 175, so that the second electrode of the first transistor T1, the second electrode of the storage capacitor Cst, and the first electrode of the fifth transistor T5 are initialized.

Thereafter, while the first scan signal GW and the second scan signal SS are changed to a gate-off voltage (a low-level voltage) and the emitting signal EM is changed to a gate-on voltage (a high-level voltage), the light-emitting period proceeds.

As a result, a current path including the fifth transistor T5 and the sixth transistor T6 turned on by the light-emitting signal EM, the first transistor T1 turned on according to the data voltage VDATA, and the light-emitting element LED is formed. A degree at which the first transistor T1 is turned on is determined according to the data voltage VDATA, and accordingly, the current $I_{LED}$ flowing along the current path is also changed. The light-emitting element LED differently displays brightness according to an amount of the current $I_{LED}$ flowing along the current path.

In the light-emitting period of FIG. 18, the current $I_{LED}$ flowing through the light-emitting element LED may have a value as in Equation 4 described above.

In this case, since the data voltage VDATA has a voltage value compensated according to the measured threshold voltage and mobility, in Equation 4, the threshold voltage value $V_{th\_T1}$ and the mobility value μ (included in k in Equation 4) of the first transistor T1 are substantially removed, and a constant output current $I_{LED}$ may be generated despite a change in the characteristics of the first transistor T1. In addition, in Equation 4, a voltage value $V_{ELVSS}$ of the second driving voltage ELVSS is not included, and an output current that is not affected by a drop in the second driving voltage ELVSS may be generated.

Even in the embodiment of FIG. 18, the voltages of the gate electrode of the first transistor T1 and the first electrode of the storage capacitor Cst in the light-emitting period are different from the voltages thereof in the writing period by ΔV1 (refer to FIG. 12).

These voltage changes are caused by the following reasons.

As the light-emitting period is entered, the fifth transistor T5 is turned on, and as a result, the voltages of the second electrode of the storage capacitor Cst and the second electrode of the first transistor T1 are changed to the second driving voltage ELVSS. Since the voltages of the second electrode of the first transistor T1 and the second electrode of the storage capacitor Cst are the initialization voltage Vint in the writing period, as the writing period is changed to the light-emitting period, a change value of the voltage of the second electrode of the storage capacitor Cst is a value obtained by subtracting the initialization voltage Vint from the second driving voltage ELVSS.

A change in the voltage of the second electrode of the storage capacitor Cst may change the voltage of the first electrode of the storage capacitor Cst, and the change value of the voltage of the first electrode of the storage capacitor Cst may be maximumly the same as the change value (a value obtained by subtracting the initialization voltage Vint from the second driving voltage ELVSS) of the voltage of the second electrode of the storage capacitor Cst. Accordingly, a value of the change ΔV1 of the voltage of the first electrode of the storage capacitor Cst, when $V_{int}$ is a voltage value of the initialization voltage Vint and $V_{ELVSS}$ is a voltage value of the second driving voltage ELVSS, may have a value of $V_{ELVSS}-V_{int}$.

As described above, even when the voltage of the gate electrode is changed in the light-emitting period, referring to Equation 4 as described above and Equation 5 that describes equations for deriving Equation 4, it may be confirmed that the current $I_{LED}$ flowing through the light-emitting element LED is not affected by ΔV1. In addition, in Equation 5, the voltage value $V_{ELVSS}$ of the second driving voltage ELVSS is not included, and it may be seen that the current flowing through the light-emitting element LED is not affected by a drop in the second driving voltage ELVSS.

In order to end the light-emitting period in FIG. 18, a gate-off voltage (a low level voltage) may be applied to the light-emitting signal EM, and then the initialization period may be performed, or the threshold voltage or mobility sensing may be performed, as in FIG. 2 and/or FIG. 5.

The pixel in the embodiment of FIG. 14 may be driven while FIG. 15, FIG. 16, and FIG. 17 are sequentially applied, or may be driven while FIG. 15, FIG. 16, and FIG. 18 are sequentially applied. However, as another variation, some periods may be removed, and the threshold voltage or mobility sensing may be performed once every time a plurality of light-emitting periods is performed.

In the above, the voltage value of the first driving voltage ELVDD is set to be greater than a value obtained by subtracting the threshold voltage value of the first transistor T1 from the voltage value of the reference voltage Vref, and the voltage value of the second driving voltage ELVSS is set to be smaller than a value obtained by subtracting the threshold voltage value of the first transistor T1 from the voltage value of the reference voltage Vref.

In the above, only the embodiment in which the third transistor T3 is connected to the first driving voltage line 172 to transmit the first driving voltage ELVDD in the equivalent circuit diagram of each pixel has been described. However, in some embodiments, the third transistor T3 may transmit a voltage other than the first driving voltage ELVDD. As described above, an embodiment in which the third transistor T3 transmits a voltage other than the first driving voltage ELVDD will be described with reference to FIG. 19 to FIG. 21.

Figure 19:
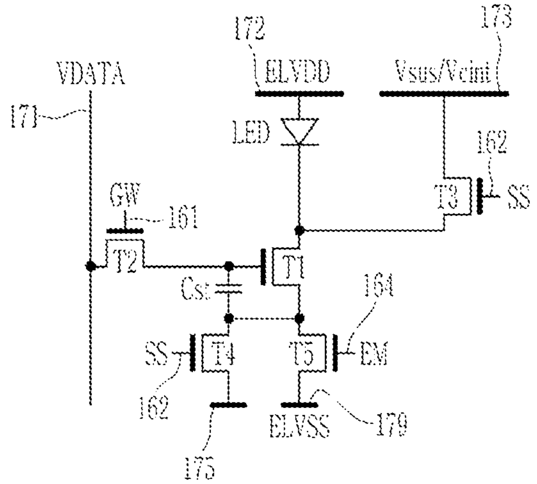
FIG. 19 to FIG. 21 illustrate equivalent circuit diagrams of another embodiment of one pixel included in a light-emitting display device.
Figure 20:
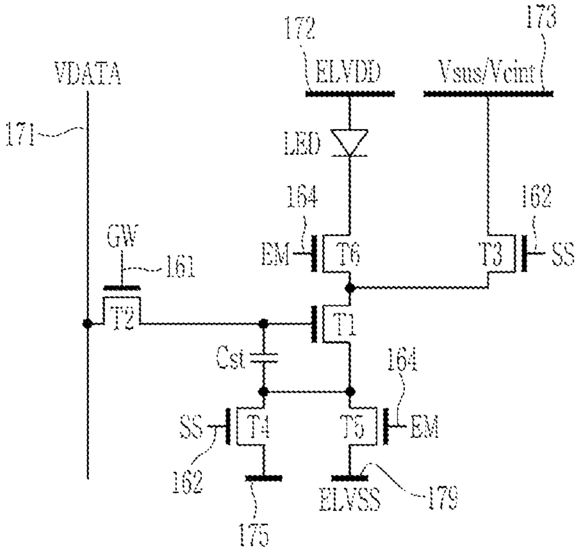
Figure 21:
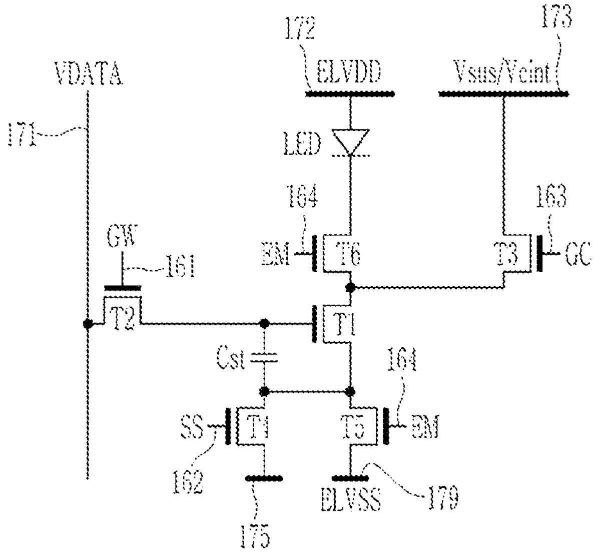

FIG. 19 to FIG. 21 illustrate equivalent circuit diagrams of an embodiment of one pixel included in a light-emitting display device.

First, the embodiment of FIG. 19 is a modified pixel of the pixel of FIG. 1, and in the embodiment of FIG. 19, the third transistor T3 may transmit a sus-voltage Vsus or an additional initialization voltage Vcint.

A connection structure of the third transistor T3 different from that of FIG. 1 will be described as follows.

The third transistor T3 includes a gate electrode connected to the second scan line 162 to which the second scan signal SS is applied, a first electrode (an input-side electrode) connected to an additional voltage line 173 that transmits the sus-voltage Vsus or the additional initialization voltage Vcint, and a second electrode (an output-side electrode) connected to the first electrode of the first transistor T1 and the cathode of the light-emitting element LED. The third transistor T3 allows the sus-voltage Vsus or the additional initialization voltage Vcint to be transmitted to the first transistor T1 without passing through the light-emitting element LED. In this case, the sus-voltage Vsus or the additional initialization voltage Vcint may have a voltage value corresponding to the first driving voltage ELVDD, and may be set to be larger than a value obtained by subtracting the threshold voltage of the first transistor T1 from the voltage value of the reference voltage Vref. The third transistor T3 is a transistor for transmitting a voltage (the sus-voltage Vsus or the additional initialization voltage Vcint) to the first transistor T1 while preventing a current from flowing through the light-emitting element LED. Therefore, the third transistor T3 may not be turned on during a light-emitting period, and may be turned on during other periods.

The embodiment of FIG. 20 is a modified pixel of the pixel of FIG. 13, and in the embodiment of FIG. 20, the third transistor T3 may transmit the sus-voltage Vsus or the additional initialization voltage Vcint.

The third transistor T3 in the embodiment of FIG. 20 is not different from the third transistor T3 of FIG. 19 in connection relationship, so an additional description thereof will be omitted.

In addition, the embodiment of FIG. 21 is a modified pixel of the pixel of FIG. 14, and in the embodiment of FIG. 21, the third transistor T3 may transmit the sus-voltage Vsus or the additional initialization voltage Vcint.

The third transistor T3 in the embodiment of FIG. 21 is different from the third transistor T3 of FIG. 19 and FIG. 20 in connection relationship, so it will be described in detail as follows.

The third transistor T3 in the embodiment of FIG. 21 includes a gate electrode connected to the third scan line 163 to which the third scan signal GS is applied, a first electrode (an input-side electrode) connected to an additional voltage line 173 that transmits the sus-voltage Vsus or the additional initialization voltage Vcint, and a second electrode (an output-side electrode) connected to the first electrode of the first transistor T1 and the cathode of the light-emitting element LED. The third transistor T3 allows the sus-voltage Vsus or the additional initialization voltage Vcint to be transmitted to the first transistor T1 without passing through the light-emitting element LED. In this case, the sus-voltage Vsus or the additional initialization voltage Vcint may have a voltage value corresponding to the first driving voltage ELVDD, and may be set to be larger than a value obtained by subtracting the threshold voltage of the first transistor T1 from the voltage value of the reference voltage Vref. The third transistor T3 is a transistor for transmitting a voltage (the sus-voltage Vsus or the additional initialization voltage Vcint) to the first transistor T1 while preventing a current from flowing through the light-emitting element LED. Therefore, the third transistor T3 may not be turned on during a light-emitting period, and may be turned on during other periods.

In the above, the structures and operations of various pixels have been described.

Hereinafter, an embodiment of an initialization and sensing operation part, which is a part of a driver connected to the sensing line 175 of the pixel, will be described in detail with reference to FIG. 22.

Figure 22:
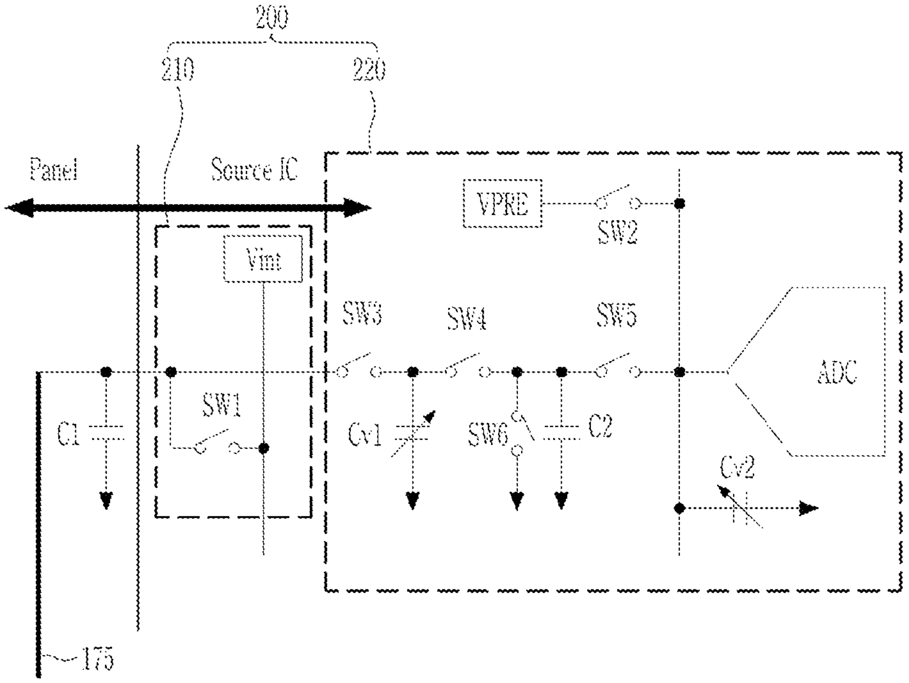
FIG. 22 illustrates an embodiment of an initialization and sensing operation part.

FIG. 22 illustrates an initialization and sensing operation part in an embodiment.

The initialization and sensing operation part 200 of FIG. 22 is formed in a driving chip Source IC attached to a non-display area disposed around a display area of a light-emitting display panel Panel, and includes an initialization part 210 and a sensing operation part 220.

The sensing line 175 connected to the pixel formed in the display area of the light-emitting display panel Panel extends to be connected to the initialization and sensing operation part 200, and a first capacitor C1 (hereinafter also referred to as an input capacitor) may be disposed at a portion where the initialization and sensing operation part 200 and the sensing line 175 are connected.

The initialization part 210 includes a first switch part SW1 provided with one end to which the initialization voltage Vint is applied and the other end that is connected to the sensing line 175. When it is desired to apply the initialization voltage Vint to the pixel through the sensing line 175, the first switch part SW1 is turned on to apply the initialization voltage Vint to the sensing line 175. The sensing line 175 may transmit the initialization voltage Vint to the sensing line 175 in the initialization period or the writing period. When the threshold voltage is sensed and the mobility is sensed, the first switch part SW1 is turned off so that the initialization voltage Vint is not applied to the sensing line 175. The first switch part SW1 may be configured with a transistor, and may apply a separate signal to turn on the transistor so that the initialization voltage Vint is transmitted to the sensing line 175.

The sensing operation part 220 in the embodiment of FIG. 22 includes five switch parts SW2, SW3, SW4, SW5, and SW6, three capacitors C2, Cv1, and Cv2, and an analog-digital converter ADC.

The second switch part SW2 may receive a pre-charge voltage VPRE at one end so that it may be pre-charged when the threshold voltage is sensed or the mobility is sensed. One end of the third switch part SW3 is connected to the sensing line 175, and the other end thereof is connected to one end of the first variable capacitor Cv1 and the fourth switch part SW4, the other end of the fourth switch part SW4 is connected to one end of the sixth switch part SW6 and one end of the fifth switch part SW5, and the other end of the fifth switch part SW5 is connected to the other end of the second switch part SW2, the second variable capacitor Cv2, and the analog-to-digital converter ADC.

As a result, in order for the pre-charge voltage VPRE to be applied to the sensing line 175 or for the analog-to-digital converter ADC to be connected to the sensing line 175, the second switch part SW2, the third switch part SW3, the fourth switch part SW4, and the fifth switch part SW5 should all be connected.

The first variable capacitor Cv1 and the second variable capacitor Cv2 may be changed to values that may have impedance matching in consideration of the capacitance values of the first and second capacitors C1 and C2 and the capacitance value of the sensing line 175.

In some embodiments, at least one of the third switch part SW3, the fourth switch part SW4, and the fifth switch part SW5 may be omitted. The sixth switch part SW6 may remove charges remaining in the initialization and sensing operation part 200, the initialization part 210, the sensing operation part 220, and the sensing line 175.

Here, the second switch part SW2, the third switch part SW3, the fourth switch part SW4, the fifth switch part SW5, and the sixth switch part SW6 may be configured with a transistor, and they may apply a separate signal to turn a transistor on or off.

The sensing operation part 220 as shown in FIG. 22 may previously supply the pre-charge voltage VPRE to the sensing line 175 to pre-charge a voltage level of the sensing line to a predetermined voltage level when the threshold voltage is sensed or the mobility is sensed and then to separate the sensing line 175 and the sensing operation part 220 to float the sensing line 175, and then it may connect the sensing line 175 and the sensing operation part 220 again and may measure a voltage or current value through the sensing line 175 to sense the threshold or the mobility.

In the embodiment of FIG. 22, in order to supply the pre-charge voltage VPRE to the sensing line 175, the second switch part SW2, the third switch part SW3, the fourth switch part SW4, and the fifth switch part SW5 may all be turned on.

In addition, in order to separate the sensing line 175 and the sensing operation part 220 from each other, at least one of the third switch part SW3, the fourth switch part SW4, and the fifth switch part SW5 may be turned off, and thereafter, in order to connect the sensing line 175 and the sensing operation part 220, all of the third switch part SW3, the fourth switch part SW4, and the fifth switch part SW5 may be turned on. In this case, the second switch part SW2 and the sixth switch part SW6 may not be turned on.

Sensing the voltage or current of the pixel through the sensing line 175 may be performed through the analog-to-digital converter ADC, and the analog-to-digital converter ADC may convert and output voltage and current values, which are analog values, into digital values.

According to the initialization and sensing operation part 200 as described above, it is possible to apply the initialization voltage Vint at different timings or to sense the voltage or current of the pixel by one sensing line 175.

Hereinafter, a structure of the light-emitting element LED stacked on an upper portion of a pixel driver may vary according to respective embodiments, which will be described with reference to FIG. 23 and FIG. 24, respectively.

Figure 23:
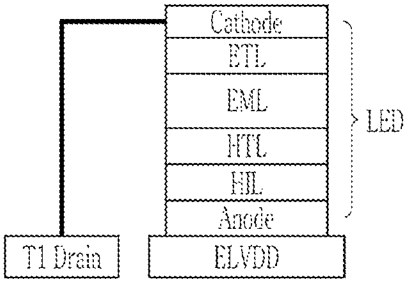
FIG. 23 and FIG. 24 schematically illustrate an embodiment of a stack structure of a light-emitting element and a connection structure with a first transistor.
Figure 24:
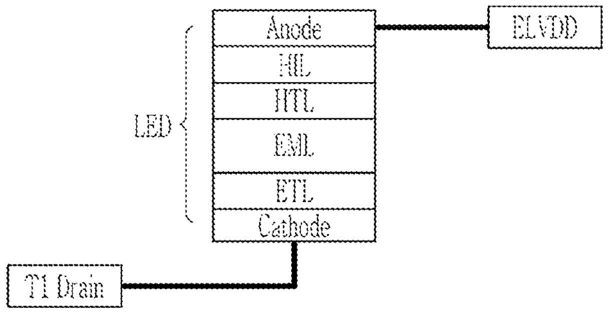

FIG. 23 and FIG. 24 schematically illustrate an embodiment of a stack structure of a light-emitting element and a connection structure with a first transistor.

First, a stacked structure of the light-emitting element LED of FIG. 23 will be described.

The light-emitting element LED of FIG. 23 is an embodiment in which a cathode Cathode is disposed at an uppermost portion by being stacked from an anode Anode disposed at a lower portion.

Referring specifically to the embodiment of FIG. 23, the light-emitting element LED is disposed on the pixel driving circuit including a first electrode T1 Drain of the first transistor T1 and the first driving voltage line to which the first driving voltage ELVDD is applied.

In light-emitting element LED, the anode Anode, a hole injection portion HIL, a hole transport portion HTL, a light-emitting layer EML, an electron transport portion ETL, and the cathode Cathode are sequentially disposed from the lower portion close to a substrate. In some embodiments, an electron injection portion may be further included between the electron transport portion ETL and the cathode Cathode. The light-emitting layer EML may include at least one of an organic light-emitting material and an inorganic light-emitting material.

The anode Anode is connected to the first driving voltage line to which the first driving voltage ELVDD is applied to transmit the first driving voltage ELVDD, and the cathode Cathode is connected to the first electrode T1 Drain of the first transistor T1, so that the output current of the first transistor T1 is inputted to the light-emitting element LED.

Holes and electrons are respectively injected into the light-emitting layer from the anode and cathode electrodes, and light is emitted when excitons in which the injected holes and electrons are combined enter a ground state from an excited state. In this case, the light-emitting element LED may emit light of one of the primary colors or white light. In embodiments, the primary colors may include three primary colors such as red, green, and blue. Another embodiment of the primary colors may include three primary colors such as yellow, cyan, and magenta. In some embodiments, the color display characteristic may be improved by further including an additional color filter or a color conversion layer on the front surface of the light-emitting element LED.

In the embodiment shown in FIG. 23, a separate connection structure must be formed to connect the cathode Cathode disposed on the upper portion and the first electrode T1 Drain of the first transistor T1 disposed on the pixel driving circuit of the lower portion. However, when the conventional stacking process of the light-emitting element LED is performed from the anode Anode, it may be stacked without changing the process, so there is an advantage that there is no need to separately change the process.

Hereinafter, a stacked structure of the light-emitting element LED of FIG. 24 will be described.

The light-emitting element LED of FIG. 24 is an embodiment in which an anode Anode is disposed at an uppermost portion by being stacked from a cathode Cathode disposed at a lower portion.

Referring specifically to the embodiment of FIG. 24, the light-emitting element LED is disposed on the pixel driving circuit including the first electrode T1 Drain of the first transistor T1.

In light-emitting element LED, the cathode Cathode, the electron transport portion ETL, the light-emitting layer EML, the hole transport portion HTL, the hole injection portion HIL, and the anode Anode are sequentially disposed from the lower portion close to a substrate. In some embodiments, an electron injection portion may be further included between the electron transport portion ETL and the cathode Cathode. The light-emitting layer EML may include at least one of an organic light-emitting material and an inorganic light-emitting material.

The anode Anode is connected to the first driving voltage line to which the first driving voltage ELVDD is applied to transmit the first driving voltage ELVDD, and the cathode Cathode is connected to the first electrode T1 Drain of the first transistor T1, so that the output current of the first transistor T1 is inputted to the light-emitting element LED.

In the embodiment shown in FIG. 24, since the cathode Cathode is disposed at the lower portion, it has a structure in which it is easy to connect the first electrode T1 Drain of the first transistor T1 disposed in the pixel driving circuit.

The connection between the first driving voltage line through which the first driving voltage ELVDD is transmitted and the anode Anode may have a structure in which it is electrically connected outside the display area.

Holes and electrons are respectively injected into the light-emitting layer from the anode and cathode electrodes, and light is emitted when excitons in which the injected holes and electrons are combined enter a ground state from an excited state. In this case, the light-emitting element LED may emit light of one of the primary colors or white light. In embodiments, the primary colors may include three primary colors such as red, green, and blue. Another embodiment of the primary colors may include three primary colors such as yellow, cyan, and magenta. In some embodiments, the color display characteristic may be improved by further including an additional color filter or color conversion layer on the front surface of the light-emitting element LED.

While this disclosure has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A light-emitting display device comprising:

a first driving voltage line transmitting a first driving voltage;

a second driving voltage line transmitting a second driving voltage;

a data line;

a sensing line;

a light-emitting element including a cathode, and an anode connected to the first driving voltage line;

a first transistor including a gate electrode, a first electrode, and a second electrode;

a second transistor including a gate electrode, a first electrode connected to the data line, and a second electrode connected to the gate electrode of the first transistor;

a third transistor including a gate electrode, a first electrode connected to the first driving voltage line, and a second electrode connected to the first electrode of the first transistor;

a fourth transistor including a gate electrode, a first electrode directly connected to the sensing line, and a second electrode connected to the second electrode of the first transistor;

a fifth transistor including a gate electrode, a first electrode connected to the second electrode of the first transistor, and a second electrode directly connected to the second driving voltage line; and a capacitor including a first electrode connected to the gate electrode of the first transistor and a second electrode directly connected to the second electrode of the first transistor, wherein the first electrode of the first transistor is connected to the cathode of the light-emitting element, and the first driving voltage of the first driving voltage line has a higher voltage than the second driving voltage of the second driving voltage line.

2. The light-emitting display device of claim 1, wherein the sensing line is electrically connected to an initialization and sensing operation part disposed in a non-display area.

3. The light-emitting display device of claim 2, wherein the initialization and sensing operation part includes:

an initialization part which transmits the initialization voltage to the sensing line; and a sensing operation part which senses a voltage or current of the second electrode of the capacitor through the sensing line.

4. The light-emitting display device of claim 3, wherein the initialization part includes a first switch part which includes a first end to which the initialization voltage is applied and a second end connected to the sensing line.

5. The light-emitting display device of claim 4, wherein the sensing operation part previously supplies a pre-charge voltage to the sensing line to pre-charge a voltage level of the sensing line to a predetermined voltage level, separates the sensing line and the sensing operation part from each other to float the sensing line, and then connects the sensing line and the sensing operation part again to measure a voltage or current through the sensing line.

6. The light-emitting display device of claim 1, wherein:

the gate electrode of the second transistor is connected to a first scan line; the gate electrode of the third transistor and the gate electrode of the fourth transistor are connected to a second scan line; and the gate electrode of the fifth transistor is connected to a light-emitting signal line.

7. The light-emitting display device of claim 6, wherein in an operation of sensing a threshold voltage of the first transistor, a gate-on voltage is applied to the first scan line and the second scan line, and a gate-off voltage is applied to the light-emitting signal line.

8. The light-emitting display device of claim 7, wherein:

the operation of sensing the threshold voltage of the first transistor is divided into an initialization period and a threshold voltage sensing period;

during the initialization period and the threshold voltage sensing period, a reference voltage is applied to the data line;

in the initialization period, the sensing line transmits the initialization voltage; and in the threshold voltage sensing period, the initialization voltage is not transmitted to the sensing line, and the sensing line transmits a voltage or current of the second electrode of the first transistor.

9. The light-emitting display device of claim 6, wherein an operation of sensing charge mobility of the first transistor is divided into: an initialization period in which a gate-on voltage is applied to the first scan line and the second scan line and a gate-off voltage is applied to the light-emitting signal line; and a mobility sensing period in which a gate-on voltage is applied to the second scan line and a gate-off voltage is applied to the first scan line and the light-emitting signal line.

10. The light-emitting display device of claim 9, wherein:

during the initialization period, a reference voltage is applied to the data line; in the initialization period, the sensing line transmits the initialization voltage; and in the mobility sensing period, the initialization voltage is not transmitted to the sensing line, and the sensing line transmits a voltage or current of the second electrode of the first transistor.

11. The light-emitting display device of claim 6, wherein:

an operation of emitting light from the light-emitting element includes a writing period and a light-emitting period;

a gate-on voltage is applied to the first scan line only in the writing period; and a gate-on voltage is applied to the light-emitting signal line and a gate-off voltage is applied to the second scan line, in the writing period and the light-emitting period.

12. The light-emitting display device of claim 6, wherein:

an operation of emitting light from the light-emitting element includes a writing period and a light-emitting period;

in the writing period, a gate-on voltage is applied to the first scan line and the second scan line, and a gate-off voltage is applied to the light-emitting signal line; and in the light-emitting period, a gate-off voltage is applied to the first scan line and the second scan line, and a gate-on voltage is applied to the light-emitting signal line.

13. The light-emitting display device of claim 6, further comprising a sixth transistor disposed between the light-emitting element and the first transistor, wherein a gate electrode of the sixth transistor is connected to the light-emitting signal line, a first electrode of the sixth transistor is directly connected to the cathode of the light-emitting element, and a second electrode of the sixth transistor is directly connected to the first electrode of the first transistor.

14. The light-emitting display device of claim 1, wherein: the sensing line includes a switch in which an initialization voltage is transmitted on the sensing line when the switch is in a first position and in which a voltage or current on the second electrode is instead transmitted by the sensing line when the switch is in a second position based on the voltage value of the second electrode, the sensing line being configured to sense the voltage or current of the second electrode of the first transistor.

15. A light-emitting display device comprising:

a first driving voltage line transmitting a first driving voltage;

a second driving voltage line transmitting a second driving voltage;

a data line;

a sensing line;

a light-emitting element including a cathode, and an anode connected to the first driving voltage line;

a first transistor including a gate electrode, a first electrode, and a second electrode;

a second transistor including a gate electrode, a first electrode connected to the data line, and a second electrode connected to the gate electrode of the first transistor;

a third transistor including a gate electrode, a first electrode directly connected to the first driving voltage line, and a second electrode connected to the first electrode of the first transistor;

a fourth transistor including a gate electrode, a first electrode connected to the sensing line, and a second electrode directly connected to the second electrode of the first transistor;

a fifth transistor including a gate electrode, a first electrode connected to the second electrode of the first transistor, and a second electrode connected to the second driving voltage line;

a sixth transistor including a gate electrode, a first electrode connected to the cathode of the light-emitting element, and a second electrode connected to the first electrode of the first transistor; and a capacitor including a first electrode connected to the gate electrode of the first transistor and a second electrode directly connected to the second electrode of the first transistor, wherein the first driving voltage of the first driving voltage line has a higher voltage than the second driving voltage of the second driving voltage line.

16. The light-emitting display device of claim 15, wherein:

the gate electrode of the second transistor is connected to a first scan line;

the gate electrode of the fourth transistor is connected to a second scan line;

the gate electrode of the third transistor is connected to a third scan line; and the gate electrode of the fifth transistor and the gate electrode of the sixth transistor are connected to a light-emitting signal line.

17. The light-emitting display device of claim 16, wherein:

an operation of the first transistor is divided into an initialization period and a threshold voltage sensing period;

in the initialization period, a gate-on voltage is applied to the first scan line and the second scan line, and a gate-off voltage is applied to the third scan line and the light-emitting signal line;

in the threshold voltage sensing period, a gate-on voltage is applied to the first scan line, the second scan line, and the third scan line, and a gate-off voltage is applied to the light-emitting signal line;

during the initialization period and the threshold voltage sensing period, a reference voltage is applied to the data line;

in the initialization period, the sensing line transmits an initialization voltage; and in the threshold voltage sensing period, the initialization voltage is not transmitted to the sensing line, and the sensing line transmits a voltage or current of the second electrode of the first transistor.

18. The light-emitting display device of claim 16, wherein an operation of sensing charge mobility of the first transistor is divided into:

an initialization period in which a gate-on voltage is applied to the first scan line and the second scan line and a gate-off voltage is applied to the third scan line and the light-emitting signal line; and a mobility sensing period in which a gate-on voltage is applied to the second scan line and the third scan line and a gate-off voltage is applied to the first scan line and the light-emitting signal line;

during the initialization period, a reference voltage is applied to the data line;

in the initialization period, the sensing line transmits an initialization voltage; and in the mobility sensing period, the initialization voltage is not transmitted to the sensing line, and the sensing line transmits a voltage or current of the second electrode of the first transistor.

19. The light-emitting display device of claim 16, wherein:

an operation of emitting light from the light-emitting element includes a writing period and a light-emitting period;

a gate-on voltage is applied to the first scan line only in the writing period; and a gate-on voltage is applied to the light-emitting signal line and a gate-off voltage is applied to the second scan line and the third scan line, in the writing period and the light-emitting period.

20. The light-emitting display device of claim 16, wherein:

an operation of emitting light from the light-emitting element includes a writing period and a light-emitting period;

in the writing period, a gate-on voltage is applied to the first scan line and the second scan line, and a gate-off voltage is applied to the third scan line and the light-emitting signal line; and in the light-emitting period, a gate-off voltage is applied to the first scan line, the second scan line, and third scan line, and a gate-on voltage is applied to the light-emitting signal line.

21. The light-emitting display device of claim 15, wherein the sensing line is electrically connected to an initialization and sensing operation part disposed in a non-display area, and the initialization and sensing operation part includes:

an initialization part which transmits an initialization voltage to the sensing line; and a sensing operation part which senses a voltage or current of the second electrode of the capacitor through the sensing line.

22. The light-emitting display device of claim 15, wherein:

the sensing line includes a switch in which an initialization voltage is transmitted on the sensing line when the switch is in a first position and in which a voltage or current of the second electrode is instead transmitted by the sensing line when the switch is in a second position, the switch being set to either the first position or the second position based on a voltage value of the second electrode, the sensing line being configured to sense the voltage or current of the second electrode of the first transistor.

* * * * *